US012389301B2

(12) United States Patent
Selvaganapathy et al.

(10) Patent No.: US 12,389,301 B2
(45) Date of Patent: Aug. 12, 2025

(54) SECURITY KEY MANAGEMENT IN DUAL CONNECTIVITY OPERATION

(71) Applicant: Nokia Technologies Oy, Espoo (FI)

(72) Inventors: Srinivasan Selvaganapathy, Bangalore (IN); Ahmad Awada, Munich (DE); Halit Murat Gürsu, Munich (DE)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/923,586

(22) Filed: Oct. 22, 2024

(65) Prior Publication Data
US 2025/0048226 A1    Feb. 6, 2025

Related U.S. Application Data

(63) Continuation of application No. PCT/EP2023/066774, filed on Jun. 21, 2023.

(51) Int. Cl.
*H04W 36/36* (2009.01)
*H04W 12/041* (2021.01)
*H04W 88/06* (2009.01)

(52) U.S. Cl.
CPC ....... *H04W 36/362* (2023.05); *H04W 12/041* (2021.01); *H04W 88/06* (2013.01)

(58) Field of Classification Search
CPC .. H04W 36/362; H04W 12/041; H04W 88/06
See application file for complete search history.

(56) References Cited

U.S. PATENT DOCUMENTS

| | | | | |
|---|---|---|---|---|
| 11,182,566 B2* | 11/2021 | Jaitly | ................... | G10L 15/16 |
| 11,251,923 B2* | 2/2022 | Wang | ................... | H04L 1/1861 |
| 11,770,830 B2* | 9/2023 | Lindqvist | ............... | H04L 5/0051 |
| | | | | 370/329 |
| 11,868,880 B2* | 1/2024 | Rangarajan | ............... | G06N 3/08 |
| 11,917,657 B2* | 2/2024 | Cao | ................... | H04W 72/52 |

(Continued)

FOREIGN PATENT DOCUMENTS

EP      3361763 B1    8/2020
WO   2021/064032 A1    4/2021

OTHER PUBLICATIONS

"Msc-generator", Sourceforge, Retrieved on Feb. 11, 2025, Webpage available at :https://sourceforge.net/projects/msc-generator/.

(Continued)

*Primary Examiner* — Julio R Perez
(74) *Attorney, Agent, or Firm* — Nokia Technologies Oy

(57) ABSTRACT

The disclosure inter alia relates to a user equipment configured to support dual connectivity operation towards a master node and a secondary node of a radio access network, the user equipment comprising at least one processor and at least one memory, the at least one memory storing instructions that, when executed by the at least one processor, cause the user equipment to perform at least the following: establishing a connection towards the master node; receiving configuration information from the master node, wherein the configuration information comprises key counter information which defines a sequence of at least two different key counter values to generate at least two different security keys for at least two different target secondary nodes.

25 Claims, 5 Drawing Sheets

(56) References Cited

U.S. PATENT DOCUMENTS

| | | | |
|---|---|---|---|
| 2016/0119840 A1* | 4/2016 | Loehr | H04L 1/1822 |
| | | | 370/331 |
| 2021/0022053 A1* | 1/2021 | Cirik | H04B 7/088 |
| 2021/0152350 A1 | 5/2021 | Ai et al. | |
| 2024/0413836 A1* | 12/2024 | Marpe | H03M 7/40 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 17)", 3GPP TS 36.300, V17.1.0, Jun. 2022, pp. 1-401.

"3rd Generation Partnership Project; Technical Specification Group Radio Access Network; Evolved Universal Terrestrial Radio Access (E-UTRA) and NR; Multi-connectivity; Stage 2 (Release 17)", 3GPP 3GPP TS 37.340, V17.1.0, Jun. 2022, pp. 1-112.

"3rd Generation Partnership Project; Technical Specification Group Radio Access Network; NR; Radio Resource Control (RRC) protocol specification (Release 17)", 3GPP TS 38.331, V17.1.0, Jun. 2022, pp. 1-1273.

"3rd Generation Partnership Project; Technical Specification Group Services and System Aspects; Security architecture and procedures for 5G system (Release 17)", 3GPP TS 33.501, V17.6.0, Jun. 2022, pp. 1-292.

International Search Report and Written Opinion received for corresponding Patent Cooperation Treaty Application No. PCT/EP2023/066774, dated Sep. 28, 2023, 15 pages.

"Security support for NR-NR DC", 3GPP TSG-RAN WG2#103, R2-1811713, Agenda: 10.5.4, Huawei, Aug. 20-24, 2018, 2 pages.

* cited by examiner

SECURITY KEY MANAGEMENT IN DUAL CONNECTIVITY OPERATION

TECHNOLOGICAL FIELD

The present disclosure is related to, but not limited to, dual connectivity operation in the context of radio access networks, as defined by the 3rd Generation Partnership Project (3GPP) standard, such as the 5G standard which is also referred to as New Radio (NR). The disclosure in particular pertains to security key management in such a dual connectivity operation, and more particular to the management of security keys for secondary nodes for dual connectivity operation.

BACKGROUND

Dual connectivity (DC) is a mode of operation where a user equipment (UE), which is capable of multiple transmission and reception, is configured to utilise resources provided by two different radio nodes. One node acts as master node (MN) and the other node acts as secondary node (SN). The MN and SN are connected via a network interface and at least the MN is connected to the core network. A master cell group (MCG) is a group of at least one serving cell associated with the MN, and a secondary cell group (SCG) is a group of at least one serving cell associated with the SN (see e.g. references [1], [2]).

For integrity protection and ciphering of radio resource control (RRC) signalling and user data, the security key $K_{gNB}$ is used, which is generated based on non-access stratum (NAS) level keys. The $K_{gNB}$ can be refreshed to ensure horizontal mobility across nodes without changing the core network (see e.g. reference [3]).

In the case of DC, the radio bearers can be assigned to the MCG and the SCG, and the mobility of the UE across the SCG can be independent of the mobility in the MCG. Therefore, to refresh the security keys for SCG bearers without impacting the ongoing security procedures for MCG bearers, a new security key $KS_N$ for SCG bearers is introduced. The $K_{SN}$ is refreshed by the UE based on an SN counter value that is provided to the UE by the MN (see e.g. reference [4]).

SUMMARY OF SOME EXEMPLARY EMBODIMENTS

However, there is a problem that according to the present 5G standard, after performing a conditional addition or change (CPAC) of a primary cell of a secondary cell group (PSCell), or after performing a conditional handover (CHO), the CPAC or CHO configuration data is released by the UE after the CPAC or CHO has been executed. In addition, the configuration message for CPAC or CHO can only contain one SN counter value. Therefore, whenever the UE has moved from a previous serving SCG to a current serving SCG, a new configuration message has to be sent by the MN in order to prepare the UE for subsequent cell group changes to possible future target SCGs. In this context, the possible future target SCGs also include the previous serving SCG, since the UE likewise has to be prepared for switching back to the previous serving SCG. Since the configuration message is transmitted by RRC signalling, a significant RRC signalling overhead is generated, in particular when a large number of CPACs or CHOs is performed within short time. Furthermore, the requirement of sending the new configuration message before being able to perform subsequent cell group changes limits fast mobility of the UE across different SCGs.

In view of the above, example embodiments of the present disclosure may have inter alia the effect of enabling a user equipment to perform autonomous security key refreshing without network involvement. Accordingly, new configuration messages for CPAC or CHO can be omitted in certain situations, such that RRC signalling overhead is reduced and fast mobility of the UE across different SCGs is enabled to a greater extent.

According to a first exemplary aspect, a user equipment is disclosed. The user equipment may be configured to support dual connectivity operation towards a master node and a secondary node of a radio access network. The user equipment may comprise at least one processor and at least one memory. The at least one memory may store instructions that, when executed by the at least one processor, cause the user equipment to perform at least the following:
  establishing a connection towards the master node;
  receiving configuration information from the master node, wherein the configuration information may comprise key counter information which defines a sequence of at least two different key counter values to generate at least two different security keys for at least two different target secondary nodes.

The user equipment may be a stationary device or a mobile device. In particular, the user equipment may be a mobile device, such as a smartphone, a tablet, a wearable, a smartwatch, a low power device, an IoT device, an HoT device, a vehicle, a truck, a drone, an airplane, or the like. The user equipment may in particular be capable of communicating with (transmitting and receiving signals and/or data to/from) one or more other user equipments. Additionally or alternatively, the user equipment may in particular be capable of communicating with (transmitting and receiving signals and/or data to/from) at least one master node of a radio access network, the master node configured to support dual connectivity operation towards a secondary node of the radio access network and the user equipment. Additionally or alternatively, the user equipment may in particular be capable of communicating with (transmitting and receiving signals and/or data to/from) at least one secondary node of a radio access network, the secondary node configured to support dual connectivity operation towards a master node of the radio access network and the user equipment. Generally, the user equipment may also be any device enabled for communication with a communication network and/or another user equipment.

A radio node (e.g. a master node or a secondary node) may be understood as a wireless communication station installed at a fixed or mobile location and may in particular be or comprise an entity of a radio access network of a wireless communication system. For instance, the radio node may be, comprise, or be part of a base station of a wireless communication network of any generation (e.g. a gNB, ng-eNB, eNodeB, NodeB, BTS or the like) of a 3GPP standard. Generally, the radio node may be or comprise a hardware or software component implementing a certain functionality. In an example, the radio node may be a location management function (LMF). In an example, the radio node may be an entity as defined by 3GPP 5G or NR standard (also referred to as gNB). Accordingly, while the radio node may be understood to be implemented in or be a single device or module, the radio node may also be implemented across or comprise multiple devices or modules. As such, the radio node may in particular be implemented in or be a stationary device. Multiple radio nodes may in particular establish a wireless communication system or network, which may in particular be an NR or 5G system or any other wireless communications system defined by a past or future standard, in particular successors of the present 3GPP standards. In particular, multiple radio nodes, for example a master node and one or more secondary nodes, may be configured to support dual connectivity operation towards one or more user equipments. The radio node may be capable of being in direct and/or indirect communication with other radio nodes or with user equipment.

As used herein, configuration information may be understood as any kind of information based on which a user equipment is or can be configured with respect to dual connectivity operation and/or security key management. For example, the configuration information may be RRC reconfiguration information, in particular as part of an RRC reconfiguration request towards a user equipment.

As used herein, key counter information may be understood as any kind of information which defines at least one value of a key counter, the key counter being associated with a security key. For example, the key counter information may be, comprise, be indicative of, enable to determine, or similarly specify explicitly or implicitly at least one previous, present or future value of a key counter. For example, the key counter value may define a value of an SN counter.

As used herein, a sequence may be understood as an ordered series of similar elements following a certain pattern. As an example, a sequence may have an initial element and a final element, in particular if the sequence is a finite sequence. As another example, a sequence may have an initial element, but may not have a final element, in particular if the sequence is an infinite sequence. For example, the sequence may be an ordered series of numbers or values following a certain pattern. For example, a sequence may be an ordered series of integers, in particular non-negative integers, wherein subsequent elements may be obtained from preceding elements by iteratively adding a predefined step value. For example, the predefined step value may be equal to one.

As used herein, a key counter value may be understood as a value of a key counter, the key counter being associated with a security key. For example, the key counter value may be used as a freshness input into subsequent derivations of the security key. For example, the key counter value may be a value of an SN counter. For example, the key counter value may be a number, in particular a non-negative integer.

As used herein, the key counter information defining a sequence of at least two different key counter values may be understood such that the at least two different key counter values can be derived from the key counter information in any conceivable way, at a present or future point of time. For example, the key counter information may define a sequence of at least two different key counter values in that the key counter information is, comprises, is indicative of, enables to determine, or similarly specifies explicitly or implicitly an initial element of the sequence together with a rule regarding the derivation of further elements of the sequence. For example, the elements of the sequence may form a monotonously increasing sequence, in particular a sequence of non-negative integers monotonously increasing by one. Thereby, it can be prevented in a particular simple way that key counter values are used more than once for the generation of a security key.

As used herein, a security key may be understood as a piece of information, in particular a string of characters, used for security purposes in a radio access network. For example, the string of characters may comprise numbers, letters, symbols, special characters, and the like. For example, the security key may be secret. For example, the security key may be a security key for integrity protection and/or ciphering of data, in particular of data exchanged between a user equipment and a secondary node of a radio access network. For example, the security key may be a superordinated security key based on which a plurality of subordinated security keys for integrity protection and/or ciphering, in particular a first subordinated security key for integrity protection of RRC signalling, a second subordinated security key for ciphering of RRC signalling, a third subordinated security key for integrity protection of user data, and a fourth subordinated security key for ciphering of user data, are determined. For example, the security key may be a $K_{SN}$ security key.

As used herein, ciphering may be understood as a general concept of converting information between so-called plaintext, which is a decrypted form of the information in a format readily readable by a human or computer, and so-called ciphertext, which is an encrypted form of the information in a format not readable by a human or computer without proper decryption. Accordingly, ciphering includes both enciphering of information from plaintext to ciphertext, and deciphering of information from ciphertext to plaintext.

As used herein, a target secondary node may be understood as a secondary node of a radio access network, the associated secondary cell group (SCG) of which qualifies or may qualify, at a respective present or future point of time, for a conditional PSCell addition or change (CPAC) or a conditional handover (CHO) towards the SCG associated with the target secondary node. For example, a target secondary node is different from a source secondary node, wherein a source secondary node as used herein may be understood as a secondary node associated with a current serving SCG. Nevertheless, a target secondary node may also be identical with a source secondary node in that the SCG associated with the source secondary node qualifies or may qualify, at a future point of time, for a subsequent CPAC or CHO back to the SCG associated with the source secondary node, after a CPAC or CHO from the SCG associated with the source secondary node towards an SCG associated with a target secondary node different from the source secondary node has been performed.

According to the first exemplary aspect, the user equipment may establish a connection towards the master node. Thereby, it can be achieved that the exchange of data between the UE and the MN is enabled. For example, the connection may be a secured connection, in particular a secured RRC signalling connection.

Furthermore, according to the first exemplary aspect, the user equipment may receive configuration information from the master node, wherein the configuration information comprises key counter information which defines a sequence of at least two different key counter values to generate at least two different security keys for at least two different target secondary nodes. Compared to a scenario, in which the configuration message for CPAC or CHO only contains one key counter value, and in which the CPAC or CHO configuration data is released by the UE after the CPAC or CHO has been executed, example embodiments of the first exemplary aspect may be advantageous in that new configuration messages for CPAC or CHO can be omitted in certain situations. For example, after the UE has performed a CPAC or CHO from an SCG associated with a source SN towards an SCG associated with a first target SN and has used a first key counter value derived from the key counter information to generate a first security key for the exchange of data with the first target SN, the UE is enabled to derive, from the key counter information, a second key counter value and to use the second key counter value to generate a second security key for the exchange of data with a second target SN. Therefore, the UE can autonomously perform security key refreshing for a CPAC or CHO towards the SCG associated with the second target SN without the MN having to transmit new configuration information for this CPAC or CHO to the UE. Thereby, it can also be achieved that RRC signalling overhead is reduced and fast mobility of the UE across different SCGs is enabled to a greater extent.

In example embodiments of the first exemplary aspect, the at least one memory may further store instructions that, when executed by the at least one processor, cause the user equipment to perform at least the following:

generating a first security key using a first key counter value derived from the key counter information.

As used herein, deriving a first key counter value from the key counter information may be understood such that the first key counter value is obtained by the user equipment based on the key counter information in any conceivable way. For example, the user equipment may derive the first key counter value in that it obtains a first key counter value that is identical with, comprised by, indicated by, enabled to determine by, or similarly specified explicitly or implicitly in the key counter information. As used herein, generating a first security key using a first key counter value may be understood such that the first security key is generated by the user equipment based on the first key counter value in any conceivable way. For example, the user equipment may calculate the first security key using the first key counter value as a freshness input for the calculation. By generating a first security key using a first key counter value derived from the key counter information, it can be achieved that a first security key for integrity protection and/or ciphering of data, in particular of data to be exchanged between the UE and a first target SN, can be obtained by the UE.

In example embodiments of the first exemplary aspect, the at least one memory may further store instructions that, when executed by the at least one processor, cause the user equipment to perform at least the following:

using the first security key for integrity protection and/or ciphering of data exchanged between the user equipment and a first target secondary node.

Thereby, it can be achieved that a secured exchange of data between the UE and the first target SN is performed, in particular a secured exchange of data according to the security architecture of the 5G standard.

In example embodiments of the first exemplary aspect, the at least one memory may further store instructions that, when executed by the at least one processor, cause the user equipment to perform at least the following:

processing the key counter information such that the user equipment is enabled to derive, from the processed key counter information, at least a second key counter value, which is different from the first key counter value.

As used herein, processing the key counter information may be understood such that the key counter information is modified by the user equipment in any conceivable way. For example, processing the key counter information may comprise modifying the sequence of key counter values defined by the key counter information. For example, processing the key counter information may comprise preventing the first key counter value from being re-used for the generation of security keys other than the first security key. By processing the key counter information, it can be achieved that the UE is enabled to derive, from the processed key counter information, a second key counter value and to use the second key counter value to generate a second security key for the exchange of data with a second target SN. Therefore, the UE can autonomously perform security key refreshing for a future CPAC or CHO towards the SCG associated with the second target SN without the MN having to transmit new configuration information for this CPAC or CHO to the UE. Thereby, it can also be achieved that RRC signalling overhead is reduced and fast mobility of the UE across different SCGs is enabled to a greater extent.

In example embodiments of the first exemplary aspect, the at least one memory may further store instructions that, when executed by the at least one processor, cause the user equipment to perform at least the following:

generating a second security key, which is different from the first security key, using the second key counter value derived from the processed key counter information.

As used herein, deriving the second key counter value from the processed key counter information may be understood such that the second key counter value is obtained by the user equipment based on the processed key counter information in any conceivable way. For example, the user equipment may derive the second key counter value in that it obtains a second key counter value that is identical with, comprised by, indicated by, enabled to determine by, or similarly specified explicitly or implicitly in the processed key counter information. As used herein, generating a second security key using the second key counter value may be understood such that the second security key is generated by the user equipment based on the second key counter value in any conceivable way. For example, the user equipment may calculate the second security key using the second key counter value as a freshness input for the calculation. By generating a second security key using the second key counter value derived from the processed key counter information, it can be achieved that a second security key for integrity protection and/or ciphering of data, in particular of data to be exchanged between the UE and a second target SN, can be obtained by the UE.

In example embodiments of the first exemplary aspect, the at least one memory may further store instructions that, when executed by the at least one processor, cause the user equipment to perform at least the following:

using the second security key for integrity protection and/or ciphering of data exchanged between the user equipment and a second target secondary node, which is different from the first target secondary node.

Thereby, it can be achieved that a secured exchange of data between the UE and the second target SN is performed, in particular a secured exchange of data according to the security architecture of the 5G standard.

In example embodiments of the first exemplary aspect, the at least one memory may further store instructions that, when executed by the at least one processor, cause the user equipment to perform at least the following:

further processing the key counter information such that the user equipment is enabled to derive, from the further processed key counter information, at least a further key counter value, which is different from the first key counter value and different from the second key counter value.

As used herein, further processing the key counter information may be understood such that the key counter information is further modified by the user equipment in any conceivable way. For example, further processing the key counter information may comprise further modifying the sequence of key counter values defined by the key counter information. For example, further processing the key counter information may comprise preventing the second key counter value from being re-used for the generation of security keys other than the second security key. By further processing the key counter information, it can be achieved that the UE is enabled to derive, from the further processed key counter information, a further key counter value and to use the further key counter value to generate a further security key for the exchange of data with a further target SN. Therefore, the UE can autonomously perform security key refreshing for a future CPAC or CHO towards the SCG associated with the further target SN without the MN having to transmit new configuration information for this CPAC or CHO to the UE. Thereby, it can also be achieved that RRC signalling overhead is reduced and fast mobility of the UE across different SCGs is enabled to a greater extent.

In example embodiments of the first exemplary aspect, the key counter information received from the master node may define a list of at least two different key counter values. As used herein, a list may be understood as a sequence having a final element. Thus, a list may also me understood as a finite sequence. As used herein, the key counter information defining a list of key counter values may be understood such that the list of key counter values can be derived from the key counter information in any conceivable way, at a present or future point of time. For example, the key counter information may be, comprise, be indicative of, enable to determine, or similarly specify explicitly or implicitly the list of key counter values. For example, the key counter information may define a list of key counter values in that the key counter information explicitly specifies individual key counter values of the list, in particular all individual key counter values of the list. For example, the key counter information may define a list of key counter values in that the key counter information specifies a first key counter value and a maximum number of additions, wherein the first element of the list is obtained by selecting the first key counter value and the remaining elements of the list are obtained by iteratively adding a step value to the first key counter value until the maximum number of additions has been reached. For example, the step value may be predetermined by the user equipment, or may be specified within the key counter information. For example, the step value may be equal to one. For example, the key counter information may define a list of key counter values in that the key counter information specifies a range from a first non-negative integer key counter value to a final non-negative integer key counter value, wherein the list is obtained by selecting each non-negative integer within the specified range as one element of the list of key counter values. By the key counter information received from the master node defining a list of at least two different key counter values, a particularly simple definition of the at least two different key counter values by the key counter information can be achieved, such that for example complex calculation operations are not required and respective processor resources are saved.

In example embodiments of the first exemplary aspect, generating the first security key may comprise using the first list element in the list of key counter values as the first key counter value. Thereby, a particularly simple derivation of the first key counter value from the key counter information can be achieved, such that for example complex calculation operations are not required and respective processor resources are saved.

In example embodiments of the first exemplary aspect, processing the key counter information may comprise removing the first list element from the list of key counter values. Thereby a particularly simple processing of the key counter information can be achieved, such that for example complex calculation operations are not required and respective processor resources are saved.

In example embodiments of the first exemplary aspect, generating the second security key may comprise using the presently first list element in the list of key counter values as the second key counter value. Thereby, a particularly simple derivation of the second key counter value from the processed key counter information can be achieved, such that for example complex calculation operations are not required and respective processor resources are saved.

In example embodiments of the first exemplary aspect, further processing the key counter information may comprise removing the presently first list element from the list of key counter values. Thereby a particularly simple further processing of the key counter information can be achieved, such that for example complex calculation operations are not required and respective processor resources are saved.

In example embodiments of the first exemplary aspect, the configuration information may comprise key counter information which defines a list of at least two different SN counter values to generate at least two different $K_{SN}$ security keys for at least two different target secondary nodes. The first key counter value may be a first SN counter value. The second key counter value may be a second SN counter value. The first security key may be a first $K_{SN}$ security key. The second security key may be a second $K_{SN}$ security key.

In example embodiments of the first exemplary aspect, the configuration information may comprise a radio resource control reconfiguration request.

In example embodiments of the first exemplary aspect, the configuration information may comprise information which is related to a conditional addition or change of a primary cell of a secondary cell group associated with the first target secondary node or related to a conditional handover towards the first target secondary node.

In example embodiments of the first exemplary aspect, the configuration information may comprise information which is related to a conditional addition or change of a primary cell of a secondary cell group associated with the second target secondary node or related to a conditional handover towards the second target secondary node.

In example embodiments of the first exemplary aspect, the at least one memory may further store instructions that, when executed by the at least one processor, cause the user equipment to perform at least one of the following:
  determining whether at least one condition for a conditional addition or change of a primary cell of a secondary cell group associated with the first target secondary node or at least one condition for a conditional handover towards the first target secondary node is fulfilled;
  initiating, via a random access channel, a random access procedure towards the first target secondary node using the first $K_{SN}$ security key.

In particular, initiating, via a random access channel (RACH), a random access procedure towards the first target secondary node using the first $K_{SN}$ security key may be performed in response to determining that at least one condition for a conditional addition or change of a primary cell of a secondary cell group associated with the first target secondary node or at least one condition for a conditional handover towards the first target secondary node is fulfilled.

In example embodiments of the first exemplary aspect, the at least one memory may further store instructions that, when executed by the at least one processor, cause the user equipment to perform at least one of the following:

determining whether at least one condition for a conditional addition or change of a primary cell of a secondary cell group associated with the second target secondary node or at least one condition for a conditional handover towards the second target secondary node is fulfilled;

initiating, via a random access channel, a random access procedure towards the second target secondary node using the second $K_{SN}$ security key.

In particular, initiating, via a random access channel (RACH), a random access procedure towards the second target secondary node using the second $K_{SN}$ security key may be performed in response to determining that at least one condition for a conditional addition or change of a primary cell of a secondary cell group associated with the second target secondary node or at least one condition for a conditional handover towards the second target secondary node is fulfilled.

In example embodiments of the first exemplary aspect, the at least one memory may further store instructions that, when executed by the at least one processor, cause the user equipment to perform at least the following:

transmitting, to the master node, information indicative of a connection failure.

For example, the connection failure may be a failure of a connection between the user equipment and a target secondary node. For example, the connection failure may be a failure of a random access procedure from the user equipment towards a target secondary node, in particular a random access procedure via RACH. By transmitting, to the master node, information indicative of a connection failure, it can be achieved that the MN is informed about the connection failure, such that the MN can take respective measures, if necessary.

In example embodiments of the first exemplary aspect, the at least one memory may further store instructions that, when executed by the at least one processor, cause the user equipment to perform at least the following:

receiving at least one additional list element for the list of key counter values from the master node.

In particular, receiving at least one additional list element for the list of key counter values from the master node may be performed after determining whether the number of list elements of the list of key counter values falls short of a predefined threshold and in response to determining that the number of list elements of the list of key counter values falls short of a predefined threshold. For example, the predefined threshold may be equal to one. By receiving at least one additional list element for the list of key counter values from the master node, it can be avoided that the number of list elements of the list of key counter values reaches an excessively low value, in particular zero. Correspondingly, the user equipment, after one or more key counter values have been used to generate security keys for one or more target SNs and removed from the list, can be provided with additional key counter values and is therefore enabled to generate additional security keys for additional target SNs. Thus, it can be achieved that the ability of the UE to perform a CPAC or a CHO towards SCGs associated with the additional target SNs is sustained. In particular, by continuously receiving at least one additional list element for the list of key counter values from the master node, a theoretically infinite number of CPACs or CHOs, and thus a theoretically infinite number of autonomous mobility events, can be enabled to be performed by the UE.

In example embodiments of the first exemplary aspect, the key counter information received from the master node may comprise a key counter value and an instruction to maintain the key counter value. As used herein, the key counter information comprising a key counter value may be understood such that the key counter information comprises information that explicitly specifies the key counter value. As used herein, an instruction to maintain the key counter value may be understood as an instruction towards a user equipment, not to release the key counter value, but rather to continuously process the key counter value. In particular, the user equipment may be instructed to process the key counter value after a security key has been generated using the key counter value and/or after the security key has been used for a target secondary node. By the key counter information received from the master node comprising a key counter value and an instruction to maintain the key counter value, a particularly simple derivation of the first key counter value from the key counter information can be achieved, such that for example complex calculation operations are not required and respective processor resources are saved. In addition, possible target SNs do not have to be pre-provisioned with multiple security keys.

In example embodiments of the first exemplary aspect, generating the first security key may comprise using the key counter value received from the master node as the first key counter value. Thereby, a particularly simple derivation of the first key counter value from the key counter information can be achieved, such that for example complex calculation operations are not required and respective processor resources are saved.

In example embodiments of the first exemplary aspect, processing the key counter information may comprise adding a predefined step value to the key counter value received from the master node. For example, the predefined step value may be a positive integer, in particular one. By adding a predefined step value to the key counter value, a particularly simple processing of the key counter information can be achieved, such that for example complex calculation operations are not required and respective processor resources are saved.

In example embodiments of the first exemplary aspect, generating the second security key may comprise using the present key counter value as the second key counter value. Thereby, a particularly simple derivation of the second key counter value from the processed key counter information can be achieved, such that for example complex calculation operations are not required and respective processor resources are saved.

In example embodiments of the first exemplary aspect, further processing the key counter information may comprise adding the predefined step value to the present key counter value. Thereby a particularly simple further processing of the key counter information can be achieved, such that for example complex calculation operations are not required and respective processor resources are saved.

In example embodiments of the first exemplary aspect, the configuration information may comprise key counter information which defines a sequence of at least two different SN counter values to generate at least two different $K_{SN}$ security keys for at least two different target secondary nodes. The key counter information received from the master node may comprise an SN counter value and an instruction to maintain the SN counter value. The first key counter value may be a first SN counter value. The second key counter value may be a second SN counter value. The first security key may be a first $K_{SN}$ security key. The second security key may be a second $K_{SN}$ security key.

In example embodiments of the first exemplary aspect, the key counter information received from the master node may define a maximum allowed number of additions of the predefined step value to the key counter value received from the master node. The at least one memory may further store instructions that, when executed by the at least one processor, cause the user equipment to perform at least the following determining whether the maximum allowed number of additions has been reached;

in response to determining that the maximum allowed number of additions has been reached, preventing further additions of the predefined step value to the present key counter value.

Thereby, the number of possible CPACs or CHOs performed by the UE can be specified by the MN when the MN initially transmits the configuration information comprising the key counter information to the UE, such that the number of autonomous mobility events of the UE can be limited.

In example embodiments of the first exemplary aspect, the at least one memory may further store instructions that, when executed by the at least one processor, cause the user equipment to perform at least the following:

generating a further security key, which is different from the first security key and different from the second security key, using the further key counter value derived from the further processed key counter information.

As used herein, deriving the further key counter value from the further processed key counter information may be understood such that the further key counter value is obtained by the user equipment based on the further processed key counter information in any conceivable way. For example, the user equipment may derive the further key counter value in that it obtains a further key counter value that is identical with, comprised by, indicated by, enabled to determine by, or similarly specified explicitly or implicitly in the further processed key counter information. As used herein, generating a further security key using the further key counter value may be understood such that the further security key is generated by the user equipment based on the further key counter value in any conceivable way. For example, the user equipment may calculate the further security key using the further key counter value as a freshness input for the calculation. By generating a further security key using the further key counter value derived from the further processed key counter information, it can be achieved that a further security key for integrity protection and/or ciphering of data, in particular of data to be exchanged between the UE and a further target SN, can be obtained by the UE.

In example embodiments of the first exemplary aspect, the at least one memory may further store instructions that, when executed by the at least one processor, cause the user equipment to perform at least the following:

using the further security key for integrity protection and/or ciphering of data exchanged between the user equipment and a further target secondary node, which is different from the second target secondary node.

Thereby, it can be achieved that a secured exchange of data between the UE and the further target SN is performed, in particular a secured exchange of data according to the security architecture of the 5G standard. Regarding the further target secondary node, it is only required that the further target secondary node is different from the second target secondary node, in particular in an exemplary case where the user equipment performs a CPAC or CHO from the SCG associated with the second target secondary node towards the SCG associated with the further target secondary node. However, the further target secondary node may be identical with the first target secondary node, for example, in particular in a case where the user equipment first performs a CPAC or CHO from the SCG associated with the first target secondary node towards the SCG associated with the second target secondary node, and subsequently performs a CPAC or CHO from the SCG associated with the second target secondary node back towards the SCG associated with the first (or further) target secondary node.

In example embodiments of the first exemplary aspect, the at least one memory may further store instructions that, when executed by the at least one processor, cause the user equipment to perform at least the following:

further processing the key counter information such that the user equipment is enabled to derive, from the further processed key counter information, at least one further key counter value, which is different from the first key counter value, different from the second key counter value, and different from any other key counter value derived previously from the non-processed, processed or further processed key counter information.

As used herein, further processing the key counter information may be understood such that the key counter information is further modified by the user equipment in any conceivable way. For example, further processing the key counter information may comprise further modifying the sequence of key counter values defined by the key counter information. For example, further processing the key counter information may comprise preventing a particular further key counter value from being re-used for the generation of security keys other than the particular further security key. By further processing the key counter information, it can be achieved that the UE is enabled to derive, from the further processed key counter information, at least one further key counter value and to use the at least one further key counter value to generate at least one further security key for the exchange of data with at least one further target SN. Therefore, the UE can autonomously perform security key refreshing for a future CPAC or CHO towards the SCG associated with the at least one further target SN without the MN having to transmit new configuration information for this CPAC or CHO to the UE. Thereby, it can also be achieved that RRC signalling overhead is reduced and fast mobility of the UE across different SCGs is enabled to a greater extent.

By iteratively performing the actions of generating a further security key, using the further security key for integrity protection and/or ciphering, and further processing the key counter information, a theoretically infinite number of CPACs or CHOs, and thus a theoretically infinite number of autonomous mobility events, can be enabled to be performed by the UE. Therefore, it can also be achieved that RRC signalling overhead is significantly reduced and fast mobility of the UE across different SCGs is enabled to a significantly greater extent. In certain situations however, it may also be desirable to limit the maximum number of possible CPACs or CHOs, and thus the maximum number of autonomous mobility events, which can be achieved, for example, by defining a list of key counter values having a finite number of list elements, or by defining a maximum allowed number of additions of a predefined step value to a key counter value received from the master node.

In example embodiments of the first exemplary aspect, the configuration information may further comprise information indicative of at least one target secondary cell for which generating a security key is not required. As used herein, a cell may for example cover at least a part of a geographical area served by a radio access network, in particular such that radio service is provided at least for the part of the geographical area. For example, a cell may be associated with (e.g. served by) at least one radio node. Serving a cell may for example be understood as providing radio service within the cell. For example, a network node may be associated with (e.g. serve) at least one cell. For example, at least two cells may form a cell group, in particular an SCG. By the configuration information comprising information indicative of at least one target secondary cell for which generating a security key is not required, it can be achieved that unnecessary derivations of key counter values from the key counter information, unnecessary generations of security keys, and/or unnecessary processings of the key counter information, are avoided, in particular if the user equipment moves or switches between cells within the same SCG. Such movements or switches between cells within the same SCG may for example be referred to as intra-SN selective activation. They may be performed by the UE without requiring a fresh security key, for example, since the target secondary cell is still associated to the same SN.

According to the first exemplary aspect, a respective method is disclosed, too. The method according to the first exemplary aspect may be performed by a user equipment. The user equipment may be configured to support dual connectivity operation towards a master node and a secondary node of a radio access network. The method may comprise at least the following:

establishing a connection towards the master node;
receiving configuration information from the master node, wherein the configuration information comprises key counter information which defines a sequence of at least two different key counter values to generate at least two different security keys for at least two different target secondary nodes.

Within the first exemplary aspect, the disclosure of any instruction that, when executed by the at least one processor of the user equipment, causes the user equipment to perform an action shall also be considered as a disclosure of a respective action of the method.

According to the first exemplary aspect, a respective apparatus is disclosed, too. The apparatus according to the first exemplary aspect may comprise means for performing a method according to the first exemplary aspect. Within the first exemplary aspect, the disclosure of any method action shall also be considered as a disclosure of means for performing the respective method action. Likewise, the disclosure of any means for performing a method action shall also be considered as a disclosure of the method action itself. The apparatus according to the first exemplary aspect may be a user equipment. The user equipment may be configured to support dual connectivity operation towards a master node and a secondary node of a radio access network.

The means or functionality of the user equipment according to the first exemplary aspect can be implemented in hardware and/or software. They may comprise one or multiple modules or units providing the respective functionality. They may for instance comprise at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to the first exemplary aspect, a respective non-transitory computer-readable medium is disclosed, too. The non-transitory computer-readable medium according to the first exemplary aspect may comprise program instructions that, when executed by a user equipment, cause the user equipment to perform at least a method according to the first exemplary aspect. The user equipment may be configured to support dual connectivity operation towards a master node and a secondary node of a radio access network.

The non-transitory computer-readable medium according to the first exemplary aspect could for example be a disk or a memory or the like. The program instructions could be stored in the computer-readable medium in the form of instructions encoding the computer-readable medium. The computer-readable medium may be intended for taking part in the operation of a device, like an internal or external memory, for instance a Read-Only Memory (ROM) or hard disk of a computer, or be intended for distribution of the program, like an optical disc.

According to the first exemplary aspect, a respective computer program is disclosed, too. The computer program according to the first exemplary aspect may comprise instructions which, when executed by a user equipment, cause the user equipment to at least perform a method according to the first exemplary aspect. The user equipment may be configured to support dual connectivity operation towards a master node and a secondary node of a radio access network.

The computer program according to the first exemplary aspect may be stored on a computer-readable storage medium, in particular a tangible and/or non-transitory computer-readable storage medium. In particular, the computer program according to the first exemplary aspect may be stored on a non-transitory computer-readable medium according to the first exemplary aspect.

According to a second exemplary aspect, a master node of a radio access network is disclosed. The master node may be configured to support dual connectivity operation towards a secondary node of the radio access network and a user equipment. The master node may comprise at least one processor and at least one memory. The at least one memory may store instructions that, when executed by the at least one processor, cause the master node to perform at least the following:

establishing a connection towards the user equipment;
transmitting configuration information to the user equipment, wherein the configuration information comprises key counter information which defines a sequence of at least two different key counter values to generate at least two different security keys for at least two different target secondary nodes.

By the master node establishing a connection towards the user equipment, it can be achieved that the exchange of data between the UE and the MN is enabled. For example, the connection may be a secured connection, in particular a secured RRC signalling connection.

By transmitting configuration information to the user equipment, wherein the configuration information comprises key counter information which defines a sequence of at least two different key counter values to generate at least two different security keys for at least two different target secondary nodes, example embodiments of the second exemplary aspect may be advantageous in that the user equipment may be enabled to perform autonomous security key refreshing and thus, new configuration messages for CPAC or CHO can be omitted in certain situations, as has already been explained in the context of the first exemplary aspect. Thereby, it can also be achieved that RRC signalling overhead is reduced and fast mobility of the UE across different SCGs is enabled to a greater extent.

In example embodiments of the second exemplary aspect, the key counter information transmitted to the user equipment may define a list of at least two different key counter values. Thereby, a particularly simple definition of the at least two different key counter values by the key counter information can be achieved, such that for example complex calculation operations are not required and respective processor resources are saved.

In example embodiments of the second exemplary aspect, the at least one memory may further store instructions that, when executed by the at least one processor, cause the master node to perform at least the following:
  generating a list of at least two different security keys which corresponds to the list of at least two different key counter values defined by the key counter information transmitted to the user equipment.

As used herein, the list of security keys corresponding to the list of key counter values may be understood such that at least one element in the list of security keys can be associated with a respective element in the list of key counter values, and vice-versa. In particular, each element in the list of security keys can be associated with a respective element in the list of key counter values, and vice-versa. For example, the correspondence may be such that for each number n between 1 and N, where N is the total number of list elements, the n-th element in the list of security keys is a security key that has been generated, in particular by the master node, using the n-th element in the list of key counter values. Vice versa, for each number n between 1 and N, where N is the total number of list elements, the n-th element in the list of key counter values is or has been used to generate the n-th element in the list of security keys. However, the ordering of corresponding elements in both lists does not necessarily have to be identical. For example, the element at position n in one list may correspond to an element at position n+x in the other list, where x is different from zero. By generating a list of at least two different security keys which corresponds to the list of at least two different key counter values defined by the key counter information transmitted to the user equipment, it can be achieved that a corresponding list of security keys is provided.

In example embodiments of the second exemplary aspect, the at least one memory may further store instructions that, when executed by the at least one processor, cause the master node to perform at least the following:
  transmitting request information to at least one target secondary node, wherein the request information comprises the generated list of security keys.

As used herein, request information may be understood as any kind of information related to dual connectivity operation and/or security key management with respect to the at least one target secondary node. For example, the request information may be identical with or comprised by an SN addition or modification request towards the at least one target secondary node. For example, the at least one target secondary node may comprise at least one target secondary node associated with an SCG towards which a CPAC or CHO shall be enabled to be performed. For example, the at least one target secondary node may also comprise a source secondary node associated with a current serving SCG which qualifies or may qualify, at a future point of time, for a subsequent CPAC or CHO back to the SCG associated with the source secondary node. By transmitting request information to at least one target secondary node, wherein the request information comprises the generated list of security keys, it can be achieved that the at least one target SN is provided with security keys that are consistent with the security keys generated by the UE using the elements in the list of key counter values, such that the at least one target SN is enabled to securedly exchange data with the UE, in particular after the UE performs a CPAC or CHO towards the SCG associated with the at least one target SN. Furthermore, a particular advantage of transmitting a list of at least two different security keys to the target SN is that the target SN is enabled to autonomously select a security key from the list when a CPAC or CHO towards the SCG associated with the target SN is performed, such that further involvement of the MN, in particular an SN modification procedure by the MN, is not required. In addition, the time requirement for preparing target SNs for CPAC or CHO execution is reduced, such that fast mobility of the UE across different SCGs is enabled to an even greater extent.

In example embodiments of the second exemplary aspect, the at least one memory may further store instructions that, when executed by the at least one processor, cause the master node to perform at least the following:
  receiving, from a first target secondary node, information indicative of a security key switch.

As used herein, a security key switch may be understood as an event in which a previous security key, in particular a previous security key for integrity protection and/or ciphering of data exchanged between the user equipment and a secondary node associated with a previously serving SCG, is exchanged by a present security key, in particular a present security key for integrity protection and/or ciphering of data exchanged between the user equipment and a secondary node associated with a current serving SCG. As used herein information indicative of a security key switch may be understood as any piece of information that provides an indication for a security key switch in any conceivable way. For example, the information indicative of a security key switch may be information sent by the first target secondary node indicating that a CPAC or CHO towards the SCG associated with the first target secondary node has been performed. By receiving, from a first target secondary node, information indicative of a security key switch, the MN can keep track of the security key switches, and therefore for example also of the occurring CPACs or CHOs, and perform actions in order to achieve that the security key management for the UE and the target SNs remains sustained.

In example embodiments of the second exemplary aspect, the at least one memory may further store instructions that, when executed by the at least one processor, cause the master node to perform at least the following:
  transmitting, to at least one other target secondary node, an instruction to remove the first list element from the list of security keys, wherein the at least one other target secondary node is different from the first target secondary node.

As used herein, removing the first list element from the list of security keys may be understood as any action performed by the at least one other target secondary node that prevents the first list element in the list of security keys from being used as a security key for integrity protection and/or ciphering. For example, the first list element may be removed from the list of security keys in that the first list element is completely deleted, such that the number of list items is reduced by one. For example, the first list element may be removed from the list of security keys in that the first list element is modified to become an empty list element. For example, the first list element may be removed from the list of security keys in that the first list element is marked as deactivated or non-usable. In the above context, the at least one other target secondary node may comprise, for example, at least one other target secondary node associated with an SCG towards which a CPAC or CHO may be performed at a future point of time. By transmitting, to at least one other target secondary node, an instruction to remove the first list element from the list of security keys, wherein the at least one other target secondary node is different from the first target secondary node, it can be achieved that the at least one other target SN modifies its list of security keys such that the list of security keys remains consistent with the list of key counter values processed by the UE.

In example embodiments of the second exemplary aspect, the at least one memory may further store instructions that, when executed by the at least one processor, cause the master node to perform at least the following:
receiving, from a second target secondary node, information indicative of a security key switch, wherein the second target secondary node is different from the first target secondary node.

For example, the information indicative of a security key switch may be information sent by the second target secondary node indicating that a CPAC or CHO towards the SCG associated with the second target secondary node has been performed. By receiving, from a second target secondary node, information indicative of a security key switch, wherein the second target secondary node is different from the first target secondary node, the MN can keep track of the security key switches, and therefore for example also of the occurring CPACs or CHOs, and perform actions in order to achieve that the security key management for the UE and the target SNs remains sustained.

In example embodiments of the second exemplary aspect, the at least one memory may further store instructions that, when executed by the at least one processor, cause the master node to perform at least the following:
transmitting, to at least one further target secondary node, an instruction to remove the presently first list element from the list of security keys, wherein the at least one further target secondary node is different from the second target secondary node.

As used herein, the presently first list element is to be understood as the first active or usable list element in the list of security keys at the given present point of time. For example the first active or usable list element in the list of security keys does not necessarily coincide with the first element in the list, in particular in a case where the first element in the list is an empty list element or a list element marked as deactivated on nun-usable. As used herein, removing the presently first list element from the list of security keys may be understood as any action performed by the at least one other target secondary node that prevents the presently first list element in the list of security keys from being used as a security key for integrity protection and/or ciphering. For example, the presently first list element may be removed from the list of security keys in that the presently first list element is completely deleted, such that the number of list items is reduced by one. For example, the presently first list element may be removed from the list of security keys in that the presently first list element is modified to become an empty list element. For example, the presently first list element may be removed from the list of security keys in that the presently first list element is marked as deactivated or non-usable. In the above context, the at least one further target secondary node may comprise, for example, at least one further target secondary node associated with an SCG towards which a CPAC or CHO may be performed at a future point of time. For example, the at least one further target secondary node may also comprise the first target secondary node, in particular in a case where the SCG associated with the first target secondary node qualifies or may qualify, at a future point of time, for a CPAC or CHO back to the SCG associated with the first target secondary node. By transmitting, to at least one further target secondary node, an instruction to remove the presently first list element from the list of security keys, wherein the at least one further target secondary node is different from the second target secondary node, it can be achieved that the at least one further target SN modifies its list of security keys such that the list of security keys remains consistent with the list of key counter values processed by the UE.

In example embodiments of the second exemplary aspect, the at least one memory may further store instructions that, when executed by the at least one processor, cause the master node to perform at least the following:
receiving, from the user equipment, information indicative of a connection failure.

For example, the connection failure may be a failure of a connection between the user equipment and a target secondary node. For example, the connection failure may be a failure of a random access procedure from the user equipment towards a target secondary node, in particular a random access procedure via RACH. By receiving, from the user equipment, information indicative of a connection failure, it can be achieved that the MN is informed about the connection failure, such that the MN can take respective measures, if necessary.

In example embodiments of the second exemplary aspect, the at least one memory may further store instructions that, when executed by the at least one processor, cause the master node to perform at least the following:
transmitting, to at least one target secondary node, an instruction to remove the presently first list element from the list of security keys.

For example, transmitting, to at least one target secondary node, an instruction to remove the presently first list element from the list of security keys may be performed in response to receiving, from the user equipment, information indicative of a connection failure. In this context, the at least one target secondary node may comprise, for example, a target secondary node associated with an SCG towards which a CPAC or CHO has not been possible due to a connection failure, in particular a failure of a connection between the user equipment and the target secondary node. For example, the at least one target secondary node may also comprise at least one target secondary node associated with an SCG towards which a CPAC or CHO may be performed at a future point of time. For example, the at least one target secondary node may also comprise a source secondary node associated with a current serving SCG which qualifies or may qualify, at a future point of time, for a subsequent CPAC or CHO back to the SCG associated with the source secondary node. By transmitting, to at least one target secondary node, an instruction to remove the presently first list element from the list of security keys, it can be achieved that the list of security keys of the at least one target SN remains consistent with the list of key counter values processed by the UE, in particular in a case where a connection failure has occurred and the UE has already processed the list of key counter values such that a previously first key counter value has been irretrievably removed.

In example embodiments of the second exemplary aspect, the at least one memory may further store instructions that, when executed by the at least one processor, cause the master node to perform at least the following:

transmitting at least one additional list element for the list of key counter values to the user equipment.

In particular, transmitting at least one additional list element for the list of key counter values to the user equipment may be performed after determining whether the number of list elements of the list of key counter values falls short of a predefined threshold and in response to determining that the number of list elements of the list of key counter values falls short of a predefined threshold. For example, the predefined threshold may be equal to one. By transmitting at least one additional list element for the list of key counter values to the user equipment, it can be achieved that the ability of the UE to perform CPACs or a CHOs is sustained, as has already been explained in the context of the first exemplary aspect.

In example embodiments of the second exemplary aspect, the at least one memory may further store instructions that, when executed by the at least one processor, cause the master node to perform at least the following:

transmitting at least one additional list element for the list of security keys to at least one target secondary node.

For example, the at least one additional list element for the list of security keys transmitted to the at least one target secondary node may correspond with the at least one additional list element for the list of key counter values transmitted to the user equipment. For example, the correspondence may be such that the at least one additional list element for the list of security keys is a security key that has been generated, in particular by the master node, using the at least one additional list element for the list of key counter values. By transmitting at least one additional list element for the list of security keys to at least one target secondary node, it can be achieved that the list of security keys of the at least one target SN remains consistent with the list of key counter values processed by the UE. Furthermore, it can be avoided that the number of list elements of the list of security keys reaches an excessively low value, in particular zero. Thus, it can also be achieved that the ability of the UE to perform a CPAC or a CHO towards the SCG associated with the at least one target SN is sustained.

In example embodiments of the second exemplary aspect, the key counter information transmitted to the user equipment may comprise a key counter value and an instruction to maintain the key counter value. Thereby, a particularly simple derivation of the first key counter value from the key counter information can be achieved, such that for example complex calculation operations are not required and respective processor resources are saved.

In example embodiments of the second exemplary aspect, the master node may comprise a gNB-CU-CP node. The gNB-CU-CP node may comprise at least one processor and at least one memory, wherein the instructions may be stored on the at least one memory of the gNB-CU-CP node to be executed by the at least one processor of the gNB-CU-CP node. As used herein, a gNB-CU-CP node may be understood as a logical node hosting the RRC and the control plane part of the packet data convergence protocol (PDCP) of the gNB central unit (gNB-CU) for an en-gNB or a gNB.

In example embodiments of the second exemplary aspect, the configuration information may further comprise information indicative of at least one target secondary cell for which generating a security key is not required. Thereby, it can be achieved that unnecessary derivations of key counter values from the key counter information, unnecessary generations of security keys, and/or unnecessary processings of the key counter information, are avoided, as has already been explained in the context of the first exemplary aspect.

According to the second exemplary aspect, a respective method is disclosed, too. The method according to the second exemplary aspect may be performed by a master node of a radio access network. The master node may be configured to support dual connectivity operation towards a secondary node of the radio access network and a user equipment. The method may comprise at least the following:

establishing a connection towards the user equipment;
transmitting configuration information to the user equipment, wherein the configuration information comprises key counter information which defines a sequence of at least two different key counter values to generate at least two different security keys for at least two different target secondary nodes.

Within the second exemplary aspect, the disclosure of any instruction that, when executed by the at least one processor of the master node, causes the master node to perform an action shall also be considered as a disclosure of a respective action of the method.

According to the second exemplary aspect, a respective apparatus is disclosed, too. The apparatus according to the second exemplary aspect may comprise means for performing a method according to the second exemplary aspect. Within the second exemplary aspect, the disclosure of any method action shall also be considered as a disclosure of means for performing the respective method action. Likewise, the disclosure of any means for performing a method action shall also be considered as a disclosure of the method action itself. The apparatus according to the second exemplary aspect may be a master node. The master node may be configured to support dual connectivity operation towards a secondary node of the radio access network and a user equipment.

The means or functionality of the master node according to the second exemplary aspect can be implemented in hardware and/or software. They may comprise one or multiple modules or units providing the respective functionality. They may for instance comprise at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to the second exemplary aspect, a respective non-transitory computer-readable medium is disclosed, too. The non-transitory computer-readable medium according to the second exemplary aspect may comprise program instructions that, when executed by a master node, cause the master node to perform at least a method according to the second exemplary aspect. The master node may be configured to support dual connectivity operation towards a secondary node of the radio access network and a user equipment.

The non-transitory computer-readable medium according to the second exemplary aspect could for example be a disk or a memory or the like. The program instructions could be stored in the computer-readable medium in the form of instructions encoding the computer-readable medium. The computer-readable medium may be intended for taking part in the operation of a device, like an internal or external memory, for instance a Read-Only Memory (ROM) or hard disk of a computer, or be intended for distribution of the program, like an optical disc.

According to the second exemplary aspect, a respective computer program is disclosed, too. The computer program according to the second exemplary aspect may comprise instructions which, when executed by a master node, cause the master node to at least perform a method according to the second exemplary aspect. The master node may be configured to support dual connectivity operation towards a secondary node of the radio access network and a user equipment.

The computer program according to the second exemplary aspect may be stored on a computer-readable storage medium, in particular a tangible and/or non-transitory computer-readable storage medium. In particular, the computer program according to the second exemplary aspect may be stored on a non-transitory computer-readable medium according to the second exemplary aspect.

According to a third exemplary aspect, a secondary node of a radio access network is disclosed. The secondary node may be configured to support dual connectivity operation towards a master node of the radio access network and a user equipment. The secondary node may comprise at least one processor and at least one memory. The at least one memory may store instructions that, when executed by the at least one processor, cause the secondary node to perform at least the following:
  receiving request information from the master node, wherein the request information comprises a list of at least two different security keys.

Thereby, it can be achieved that the secondary node is enabled to securedly exchange data with the user equipment, in particular after the user equipment performs a CPAC or CHO towards the SCG associated with the secondary node, as has already been explained in the context of the second exemplary aspect. Furthermore, a particular advantage of the SN receiving a list of at least two different security keys is that the SN is enabled to autonomously select a security key from the list when a CPAC or CHO towards the SCG associated with the SN is performed, such that further involvement of the MN, in particular an SN modification procedure by the MN, is not required. In addition, the time requirement for preparing target SNs for CPAC or CHO execution is reduced, such that fast mobility of the UE across different SCGs is enabled to an even greater extent.

In example embodiments of the third exemplary aspect, the at least one memory may further store instructions that, when executed by the at least one processor, cause the secondary node to perform at least the following:
  determining whether the user equipment establishes or attempts to establish a connection towards the secondary node;
  in response to determining that the user equipment establishes or attempts to establish a connection towards the secondary node, using the presently first list element in the list of security keys for integrity protection and/or ciphering of data exchanged between the secondary node and the user equipment.

Thereby, it can be achieved that a secured exchange of data between the UE and the SN is performed, in particular a secured exchange of data according to the security architecture of the 5G standard.

In example embodiments of the third exemplary aspect, the at least one memory may further store instructions that, when executed by the at least one processor, cause the secondary node to perform at least the following:
  transmitting, to the master node, information indicative of a security key switch.

Thereby, the MN is enabled to keep track of security key switches, and therefore for example also of occurring CPACs or CHOs, and perform actions in order to achieve that the security key management for the UE and SNs remains sustained, as has already been explained in the context of the second exemplary aspect.

In example embodiments of the third exemplary aspect, the at least one memory may further store instructions that, when executed by the at least one processor, cause the secondary node to perform at least the following:
  removing the presently first list element from the list of security keys.

Removing the presently first list element from the list of security keys may be performed, for example, in response to using the presently first list element in the list of security keys for integrity protection and/or ciphering of data exchanged between the secondary node and the user equipment, or in response to transmitting, to the master node, information indicative of a security key switch. By removing the presently first list element from the list of security keys, it can be achieved that the list of security keys of the SN remains consistent with the list of key counter values processed by the UE.

In example embodiments of the third exemplary aspect, the at least one memory may further store instructions that, when executed by the at least one processor, cause the secondary node to perform at least the following:
  receiving, from the master node, an instruction to remove the presently first list element from the list of security keys.

Thereby, it can be achieved that the secondary node modifies its list of security keys such that the list of security keys of the SN remains consistent with the list of key counter values processed by the UE, as has already been explained in the context of the second exemplary aspect.

In example embodiments of the third exemplary aspect, the at least one memory may further store instructions that, when executed by the at least one processor, cause the secondary node to perform at least the following:
  removing the presently first list element from the list of security keys.

Removing the presently first list element from the list of security keys may be performed, for example, in response to receiving, from the master node, an instruction to remove the presently first list element from the list of security keys. By removing the presently first list element from the list of security keys, it can be achieved that the list of security keys of the SN remains consistent with the list of key counter values processed by the UE.

In example embodiments of the third exemplary aspect, the at least one memory may further store instructions that, when executed by the at least one processor, cause the secondary node to perform at least the following:
  receiving at least one additional list element for the list of security keys from the master node.

For example, the at least one additional list element for the list of security keys received by the secondary node from the master node may correspond with the at least one additional list element for the list of key counter values transmitted from the master node to the user equipment. For example, the correspondence may be such that the at least one additional list element for the list of security keys is a security key that has been generated, in particular by the master node, using the at least one additional list element for the list of key counter values. By receiving at least one additional list element for the list of security keys from the master node, it can likewise be achieved that the list of security keys of the SN remains consistent with the list of key counter values processed by the UE, in particular in a case where the MN transmits at least one additional list element for the list of key counter values to the UE. Furthermore, it can be avoided that the number of list elements of the list of security keys reaches an excessively low value, in particular zero. Thus, it can also be achieved that the ability of the UE to perform a CPAC or a CHO towards the SCG associated with the SN is sustained.

According to the third exemplary aspect, a respective method is disclosed, too. The method according to the third exemplary aspect may be performed by a secondary node of a radio access network. The secondary node may be configured to support dual connectivity operation towards a master node of the radio access network and a user equipment. The method may comprise at least the following:

receiving request information from the master node, wherein the request information comprises a list of at least two different security keys.

Within the third exemplary aspect, the disclosure of any instruction that, when executed by the at least one processor of the secondary node, causes the secondary node to perform an action shall also be considered as a disclosure of a respective action of the method.

According to the third exemplary aspect, a respective apparatus is disclosed, too. The apparatus according to the third exemplary aspect may comprise means for performing a method according to the third exemplary aspect. Within the third exemplary aspect, the disclosure of any method action shall also be considered as a disclosure of means for performing the respective method action. Likewise, the disclosure of any means for performing a method action shall also be considered as a disclosure of the method action itself. The apparatus according to the third exemplary aspect may be a secondary node. The secondary node may be configured to support dual connectivity operation towards a master node of the radio access network and a user equipment.

The means or functionality of the secondary node according to the third exemplary aspect can be implemented in hardware and/or software. They may comprise one or multiple modules or units providing the respective functionality. They may for instance comprise at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to the third exemplary aspect, a respective non-transitory computer-readable medium is disclosed, too. The non-transitory computer-readable medium according to the third exemplary aspect may comprise program instructions that, when executed by a secondary node, cause the secondary node to perform at least a method according to the third exemplary aspect. The secondary node may be configured to support dual connectivity operation towards a master node of the radio access network and a user equipment.

The non-transitory computer-readable medium according to the third exemplary aspect could for example be a disk or a memory or the like. The program instructions could be stored in the computer-readable medium in the form of instructions encoding the computer-readable medium. The computer-readable medium may be intended for taking part in the operation of a device, like an internal or external memory, for instance a Read-Only Memory (ROM) or hard disk of a computer, or be intended for distribution of the program, like an optical disc.

According to the third exemplary aspect, a respective computer program is disclosed, too. The computer program according to the third exemplary aspect may comprise instructions which, when executed by a secondary node, cause the secondary node to at least perform a method according to the third exemplary aspect. The secondary node may be configured to support dual connectivity operation towards a master node of the radio access network and a user equipment.

The computer program according to the third exemplary aspect may be stored on a computer-readable storage medium, in particular a tangible and/or non-transitory computer-readable storage medium. In particular, the computer program according to the third exemplary aspect may be stored on a non-transitory computer-readable medium according to the third exemplary aspect.

It is to be understood that the presentation of the embodiments disclosed herein is merely by way of examples and non-limiting.

Other features of the present disclosure will become apparent from the following detailed description considered in conjunction with the accompanying drawings. It is to be understood, however, that the drawings are designed solely for purposes of illustration and not as a definition of the limits of the present disclosure, for which reference should be made to the appended claims. It should be further understood that the drawings are not drawn to scale and that they are merely intended to conceptually illustrate the structures and procedures described herein.

BRIEF DESCRIPTION OF THE FIGURES

Some example embodiments will now be described with reference to the accompanying drawings in which FIG. 1 exemplarily illustrates, in a schematic diagram, a radio environment in which example embodiments of the present disclosure may be performed.

DETAILED DESCRIPTION OF THE FIGURES

The following description serves to deepen the understanding of the present disclosure and shall be understood to complement and be read together with the description of example embodiments of the present disclosure as provided in the above SUMMARY section of this specification.

In the following and with reference to FIG. 1, an example radio environment, in which the present disclosure may be applied, is described. While the specific radio system in the examples below is a 5G system, this is only to be considered a non-limiting example.

Figure 1:
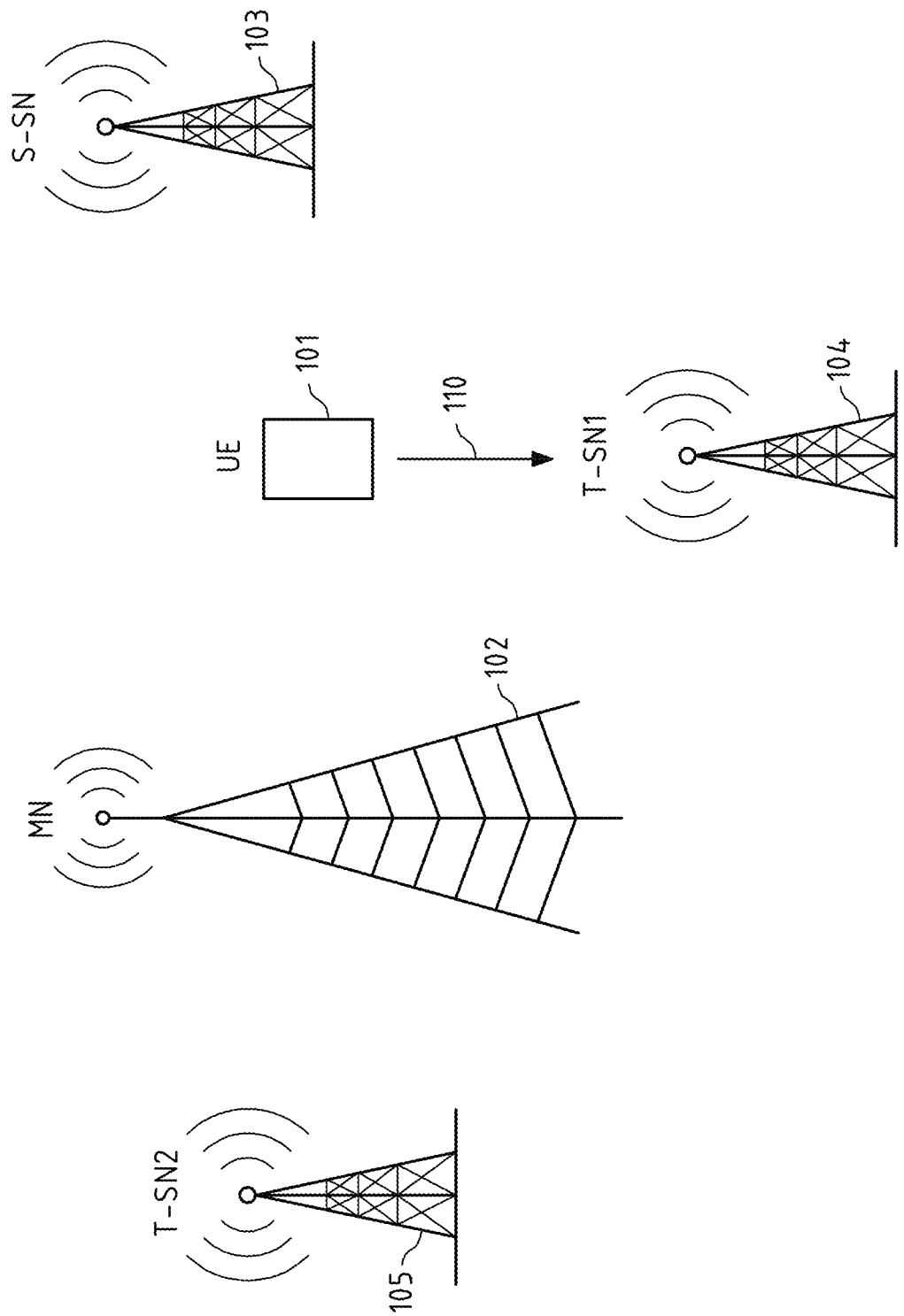

FIG. 1 exemplarily illustrates, as an example of a UE according to the first exemplary aspect, a user equipment (UE) 101, as an example of a MN according to the second exemplary aspect, a master node (MN) 102, and as examples of SNs according to the third exemplary aspect, a source secondary node (S-SN) 103, a first target secondary node (T-SN1) 104, and a second target secondary node (T-SN2) 105. Together, MN 102, S-SN 103, T-SN1 104 and T-SN2 105 may establish a wireless communication system or network serving a geographical area within which UE 101 is located. UE 101, MN 102 and SNs 103, 104, 105 may be operating in dual connectivity mode.

UE 101 may be connected with MN 102 and with one or more of SNs 103, 104, 105 by means of radio links (not shown), which may for example correspond to the 5G/NR Uu interface. MN 102 may be connected with one or more of SNs 103, 104, 105 by means of radio links (not shown), which may for example correspond to the 5G/NR Xn interface. The radio links may enable transmitting and/or receiving of information and/or signals in between the respective devices.

At some point in time, as indicated by the arrow 110, UE 101 moves from a first position to a second position. Whereas at the first position the UE may have been served by a serving cell associated with S-SN 103, a cell associated with T-SN1 104 may be serving the UE at the second position. Thus, during the movement of UE 101 along arrow 110, a CPAC or CHO of UE 101 from S-SN 103 to T-SN1 104 may have been performed.

Figure 2:
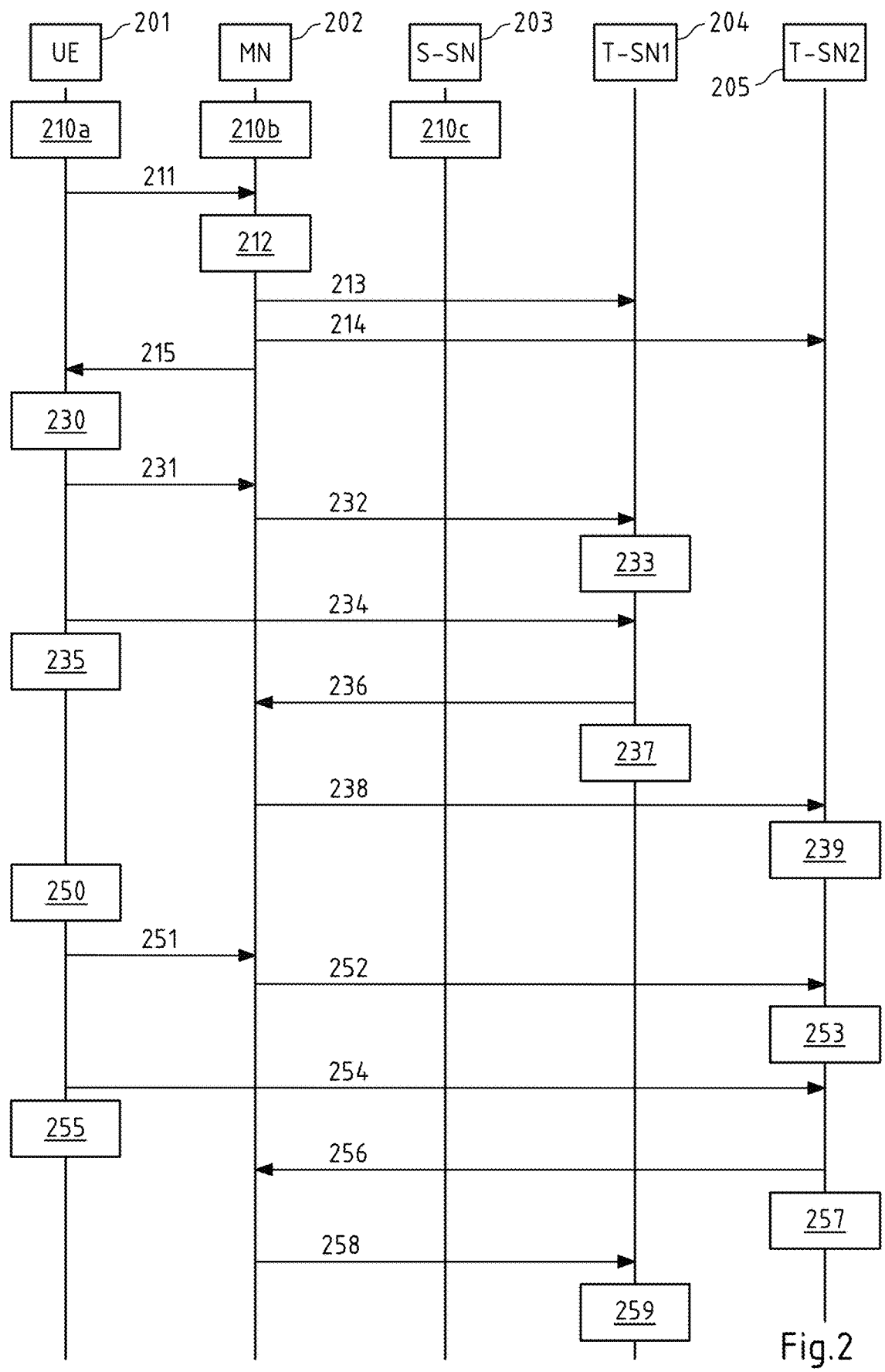
FIG. 2 shows, in a signalling flow chart, example embodiments of methods according to the first, second and third aspect.

Turning now to FIG. 2, a signalling flow chart of example embodiments of methods according to the first, second and third aspect is shown. More specifically, the succession of actions and signalling between a user equipment (UE) 201, a master node (MN) 202, a source secondary node (S-SN) 203, a first target secondary node (T-SN1) 104, and a second target secondary node (T-SN2) 205 is shown. UE 201, MN 202 and SNs 203, 204, 205 may generally be operating in dual connectivity mode.

At a specified point of time, which is denoted with 210a, 210b and 210c, UE 201, after having established a connection towards MN 202, is connected with MN 202. In addition, UE 201 is connected with S-SN 203 and served by a serving cell associated with S-SN 203. UE 201, MN 202 and S-SN 203 are operating in dual connectivity mode towards one another.

Within action 211, UE 201 transmits a first status information to MN 202. In this example embodiment, the first status information comprises measurement information related to a measurement of signal strengths of one or more SNs, in particular of S-SN 202.

Within action 212, MN 202 decides, based on the first status information received from UE 201, to configure selective activation of T-SN1 204 and T-SN2 205. Furthermore, MN 202 generates a list of SN counter values for security key $K_{SN}$, as well as a list of corresponding $K_{SN}$ security keys. Here, the SN counter values constitute a non-limiting example for key counter values according to the present disclosure, and the security key $K_{SN}$ constitutes a non-limiting example for a security key according to the present disclosure. In this particular example embodiment, a list of three different SN counter values, as well as a list of three different corresponding $K_{SN}$ security keys, are generated. However, this is only a non-limiting example, and the number of list elements of both lists could be less or more, in general. In this particular example embodiment, the 1st, 2nd and 3rd $K_{SN}$ security key in the list of $K_{SN}$ security keys is calculated, respectively, using the 1st, 2nd and 3rd element in the list of SN counter values, such that the 1st (2nd, 3rd) $K_{SN}$ security key in the list of $K_{SN}$ security keys corresponds to the 1st (2nd, 3rd) SN counter value in the list of SN counter values. However, the correspondence between both lists could also be different, in general.

Within action 213, MN 202 transmits request information to T-SN1 204. Here, the request information comprises an SN addition or change request. Furthermore, the request information comprises the list of $K_{SN}$ security keys generated within action 212.

Within action 214, MN 202 likewise transmits request information to T-SN2 205. Here, the request information likewise comprises an SN addition or change request. Furthermore, the request information likewise comprises the list of $K_{SN}$ security keys generated within action 212.

Within action 215, MN 202 transmits configuration information to UE 201. Here, the configuration information comprises an RRC reconfiguration request together with respective CPAC or CHO configuration information for T-SN1 204 and T-SN2 205. In particular, the configuration information comprises the list of SN counter values generated within action 212. Since the list of SN counter values defines a sequence of key counter values, more precisely three different key counter values in this particular non-limiting example embodiment, the list of SN counter values constitutes an example for key counter information according to the present disclosure.

In the following, a first CPAC or CHO performed by UE 201 is described.

Within action 230, UE 201 determines whether requirements for CPAC or CHO towards one or more possible target SNs are fulfilled. In response to determining that requirements for CPAC or CHO towards T-SN1 204 are fulfilled, UE 201 derives a first SN counter value by selecting the first element in the list of SN counter values. In this context, the list of key counter values is advantageous in that it allows, in a particularly simple way, the derivation of the first SN counter value, such that for example complex calculation operations are not required and respective processor resources are saved. Using the first SN counter value as freshness input, UE 201 then calculates a first $K_{SN}$ security key for T-SN1 204.

Within action 231, UE 201 transmits a second status information to MN 202. In this example embodiment, the second status information is indicative of a completion of RRC reconfiguration. After transmitting the second status information, UE 201 may attempt to establish a connection towards T-SN1 204.

Within action 232, MN 202 transmits a third status information to T-SN1 204. In this example embodiment, the third status information is indicative of a completion of reconfiguration, in particular RRC reconfiguration of UE 201.

Within action 233, T-SN1 204 determines whether UE 201 attempts to establish a connection towards T-SN1 204. In response to determining that UE 201 attempts to establish a connection towards T-SN1 204, T-SN1 204, in preparation of a subsequent data exchange, selects the first $K_{SN}$ security key in its list of $K_{SN}$ security keys received from MN 202 within action 213.

Within action 234, UE 201 and T-SN1 204 establish a connection. In this particular example embodiment, the connection is established in that UE 201 initiates a random access procedure via RACH towards T-SN1 204. After establishing the connection, UE 201 and T-SN1 204 exchange data towards one another using the first $K_{SN}$ security key for integrity protection and/or ciphering. Whereas UE 201 has obtained this first $K_{SN}$ security key by calculating it using the first SN counter value as a freshness input, T-SN1 204 has obtained this first $K_{SN}$ security key by selecting the first list element in the list of $K_{SN}$ security keys within action 233. In this particular example embodiment, UE 201 and T-SN1 204 calculate a total of four subordinated security keys based on the first $K_{SN}$ security key. A first subordinated security key is used for integrity protection of RRC signalling. A second subordinated security key is used for ciphering of RRC signalling. A third subordinated security key is used for integrity protection of user data. A fourth subordinated security key is used for ciphering of user data. By establishing the connection and exchanging data, UE 201 may now be served by a serving cell associated with T-SN1 204. UE 201, MN 202 and T-SN1 204 may be operating in dual connectivity mode towards one another.

Within action 235, UE 201 processes the list of SN counter values in that it deletes the first element in the list. Like this, the previous second element in the list of SN counter values becomes the new first element, and the previous third element becomes the new second element. Generally however, it would also be conceivable that the first element in the list is not completely deleted, but only modified to become an empty list element, or marked as unusable, for example. By processing the list of SN counter values, UE 201 is enabled to derive at a later point of time, from the processed list of SN counter values, a second SN counter value to generate a second $K_{SN}$ security key for the exchange of data with a second target SN. In this context, the second target SN may be T-SN2 205, or S-SN 203. Therefore, UE 201 can autonomously perform $K_{SN}$ refreshing for a CPAC or CHO towards the SCG associated with the second target SN without MN 202 having to transmit new configuration information for this CPAC or CHO. Thereby, it can also be achieved that RRC signalling overhead is reduced and fast mobility of UE 201 across different SCGs is enabled to a greater extent.

Within action 236, T-SN1 204 transmits, to MN 202, an information indicative of a key switch. In this particular example, the key switch is the switch towards the first $K_{SN}$ security key used for integrity protection and/or ciphering of data exchanged between UE 201 and T-SN1 204.

Within action 237, T-SN1 204 deletes the first $K_{SN}$ security key from its list of $K_{SN}$ security keys in response to using the first $K_{SN}$ security key for integrity protection and/or ciphering of data exchanged between UE 201 and T-SN1 204. Like this, the previous second element in the list of $K_{SN}$ security keys becomes the new first element, and the previous third element becomes the new second element. Generally however, it would also be conceivable that the first element in the list is not completely deleted, but only modified to become an empty list element, or marked as unusable, for example. By deleting the first $K_{SN}$ security key, it can be achieved that the list of $K_{SN}$ security keys of T-SN1 204 remains consistent with the list of SN counter values processed by UE 201.

Within action 238, MN 202 transmits, to T-SN2 205, an instruction to delete the first $K_{SN}$ security key in its list of $K_{SN}$ security keys received from MN 202 within action 214.

Within action 239, T-SN2 205 deletes the first $K_{SN}$ security key in its list of $K_{SN}$ security keys in response to receiving the respective instruction from MN 202. Like this, the previous second element in the list of $K_{SN}$ security keys becomes the new first element, and the previous third element becomes the new second element. Generally however, it would also be conceivable that the first element in the list is not completely deleted, but only modified to become an empty list element, or marked as unusable, for example. By deleting the first $K_{SN}$ security key, it can be achieved that the list of $K_{SN}$ security keys of T-SN2 205 remains consistent with the list of $K_{SN}$ security keys of T-SN1 204, and with the list of SN counter values processed by UE 201.

In the following, a second CPAC or CHO performed by UE 201 is described.

Within action 250, UE 201 determines whether requirements for CPAC or CHO towards one or more possible target SNs are fulfilled. In response to determining that requirements for CPAC or CHO towards T-SN2 205 are fulfilled, UE 201 derives a second SN counter value by selecting the presently first element in the list of SN counter values. In this context, the list of key counter values is advantageous in that it allows, in a particularly simple way, the derivation of the second SN counter value, such that for example complex calculation operations are not required and respective processor resources are saved. Using the second SN counter value as freshness input, UE 201 then calculates a second $K_{SN}$ security key for T-SN2 205.

Within action 251, UE 201 transmits a fourth status information to MN 202. In this example embodiment, the fourth status information is indicative of a completion of RRC reconfiguration. After transmitting the fourth status information, UE 201 may attempt to establish a connection towards T-SN2 205.

Within action 252, MN 202 transmits a fifth status information to T-SN2 205. In this example embodiment, the fifth status information is indicative of a completion of reconfiguration, in particular RRC reconfiguration of UE 201.

Within action 253, T-SN2 205 determines whether UE 201 attempts to establish a connection towards T-SN2 205. In response to determining that UE 201 attempts to establish a connection towards T-SN2 205, T-SN2 205, in preparation of a subsequent data exchange, selects the presently first $K_{SN}$ security key in its list of $K_{SN}$ security keys. This presently first $K_{SN}$ security key is identical with the second $K_{SN}$ security key in the original list of $K_{SN}$ security keys received from MN 202 within action 214.

Within action 254, UE 201 and T-SN2 205 establish a connection. In this particular example embodiment, the connection is established in that UE 201 initiates a random access procedure via RACH towards T-SN2 205. After establishing the connection, UE 201 and T-SN2 205 exchange data towards one another using the second $K_{SN}$ security key for integrity protection and/or ciphering. Whereas UE 201 has obtained this second $K_{SN}$ security key by calculating it using the second SN counter value as a freshness input, T-SN1 204 has obtained this second $K_{SN}$ security key by selecting the presently first list element in the list of $K_{SN}$ security keys within action 253. In this particular example embodiment, UE 201 and T-SN2 205 calculate a total of four subordinated security keys based on the second $K_{SN}$ security key. A first subordinated security key is used for integrity protection of RRC signalling. A second subordinated security key is used for ciphering of RRC signalling.

A third subordinated security key is used for integrity protection of user data. A fourth subordinated security key is used for ciphering of user data. By establishing the connection and exchanging data, UE 201 may now be served by a serving cell associated with T-SN2 205. UE 201, MN 202 and T-SN2 205 may be operating in dual connectivity mode towards one another.

Within action 255, UE 201 further processes the list of SN counter values in that it deletes the presently first element in the list. Like this, the previous second element in the list of SN counter values becomes the new first element. Generally however, it would also be conceivable that the presently first usable element in the list is not completely deleted, but only modified to become an empty list element, or marked as unusable, for example. By further processing the list of SN counter values, UE 201 is enabled to derive at a later point of time, from the further processed list of SN counter values, a further SN counter value to generate a further $K_{SN}$ security key for the exchange of data with a further target SN. In this context, the further target SN may be T-SN1 204, S-SN 203, or an additional T-SN not shown in FIG. 2. Therefore, UE 201 can autonomously perform $K_{SN}$ refreshing for a CPAC or CHO towards the SCG associated with the further target SN without MN 202 having to transmit new configuration information for this CPAC or CHO. Thereby, it can also be achieved that RRC signalling overhead is reduced and fast mobility of UE 201 across different SCGs is enabled to a greater extent.

Within action 256, T-SN2 205 transmits, to MN 202, an information indicative of a key switch. In this particular example, the key switch is the switch towards the second $K_{SN}$ security key used for integrity protection and/or ciphering of data exchanged between UE 201 and T-SN2 205.

Within action 257, T-SN2 205 deletes the presently first $K_{SN}$ security key from its list of security keys in response to using this $K_{SN}$ security key for integrity protection and/or ciphering of data exchanged between UE 201 and T-SN2 205. Like this, the previous second element in the list of $K_{SN}$ security keys becomes the new first element. Generally however, it would also be conceivable that the presently first usable element in the list is not completely deleted, but only modified to become an empty list element, or marked as unusable, for example. By deleting the presently first $K_{SN}$ security key, it can be achieved that the list of $K_{SN}$ security keys of T-SN2 205 remains consistent with the list of SN counter values processed by UE 201.

Within action 258, MN 202 transmits, to T-SN1 204, an instruction to delete the presently first $K_{SN}$ security key in its list of $K_{SN}$ security keys received from MN 202 within action 213.

Within action 259, T-SN1 204 deletes the presently first $K_{SN}$ security key in its list of security keys in response to receiving the respective instruction from MN 202. Like this, the previous second element in the list of $K_{SN}$ security keys becomes the new first element. Generally however, it would also be conceivable that the presently first usable element in the list is not completely deleted, but only modified to become an empty list element, or marked as unusable, for example. By deleting the presently first $K_{SN}$ security key, it can be achieved that the list of $K_{SN}$ security keys of T-SN1 204 remains consistent with the list of $K_{SN}$ security keys of T-SN2 205, and with the list of SN counter values further processed by UE 201.

Although not shown in FIG. 2, UE 201 may perform further CPACs or CHOs analogously to the first and second CPAC or CHO explained above.

At any suitable point of time, in particular after it has been determined by the UE 201 or by one or more of T-SN1 204 and T-SN2 205 that the list of SN counter values, or respectively the list of $K_{SN}$ security keys, falls short of a predefined threshold, UE 201 or one or more of T-SN1 204 and T-SN2 205 may transmit respective information to MN 202. In response to receiving information indicative of the list of SN counter values, or respectively the list of $K_{SN}$ security keys, falling short of the threshold, the MN 202 may transmit at least one additional list element for the list of SN counter values to UE 201, and transmit at least one additional list element for the list of $K_{SN}$ security keys to SN1 204 and/or T-SN2 205. Thereby, it can be achieved that the ability of the UE to perform a CPAC or a CHO towards SCGs associated with target SNs is sustained.

Figure 3:
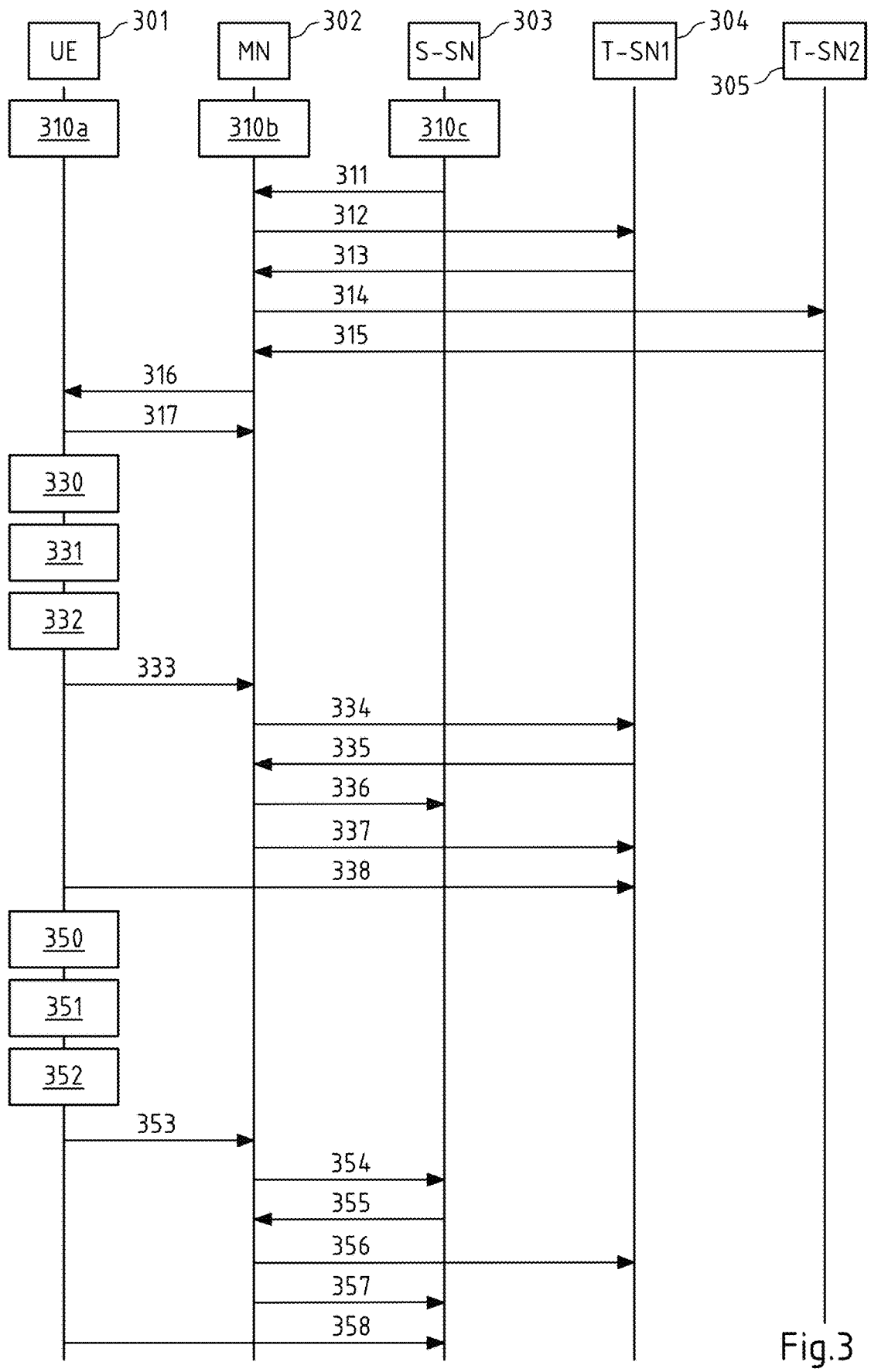
FIG. 3 shows, in a signalling flow chart, example embodiments of methods according to the first and second aspect.

FIG. 3 shows a signalling flow chart of example embodiments of methods according to the first and second aspect. More specifically, the succession of actions and signalling between a user equipment (UE) 301, a master node (MN) 302, a source secondary node (S-SN) 303, a first target secondary node (T-SN1) 304, and a second target secondary node (T-SN2) 305 is shown. UE 301, MN 302 and SNs 303, 304, 305 may generally be operating in dual connectivity mode.

At a specified point of time, which is denoted with 310a, 310b and 310c, UE 301, after having established a connection towards MN 302, is connected with MN 302. In addition, UE 301 is connected with S-SN 303 and served by a serving cell associated with S-SN 303. UE 301, MN 302 and S-SN 303 are operating in dual connectivity mode towards one another.

Within action 311, S-SN 303 transmits a first status information to MN 302. In this example embodiment, the first status information is indicative of a need for a CPAC or CHO.

Within action 312, MN 302 transmits request information to T-SN1 304. In this example embodiment, the request information comprises an SN addition or change request.

Within action 313, T-SN1 304 transmits a second status information to MN 302. In this example embodiment, the second status information is indicative of an acknowledgement of an SN addition or change request.

Within action 314, MN 302 transmits request information to T-SN2 305. In this example embodiment, the request information comprises an SN addition or change request.

Within action 315, T-SN2 305 transmits a third status information to MN 302. In this example embodiment, the third status information is indicative of an acknowledgement of an SN addition or change request.

Within action 316, MN 302 transmits configuration information to UE 301. Here, the configuration information comprises an RRC reconfiguration request together with respective CPAC or CHO configuration information. In particular, the configuration information comprises an SN counter value for security key $K_{SN}$ and an instruction to maintain the SN counter value, i.e. to continuously process the SN counter value instead of releasing it. Here, the SN counter value constitutes an example for a key counter value according to the present disclosure, and the security key $K_{SN}$ constitutes an example for a security key according to the present disclosure. Furthermore, the SN counter value together with the instruction to maintain the SN counter value constitutes an example for key counter information according to the present disclosure, since a sequence of at least two different SN counter values to generate at least two different $K_{SN}$ security keys for at least two different target SNs is thereby defined, as will be illustrated in more detail below. A particular advantage of the configuration information comprising an SN counter value and an instruction to maintain the SN counter value is that possible target SNs do not have to be pre-provisioned with multiple $K_{SN}$ security keys, as will also be illustrated in more detail below.

Within action 317, UE 301 transmits a fourth status information to MN 302. In this example embodiment, the fourth status information is indicative of a completion of RRC reconfiguration.

In the following, a first CPAC or CHO performed by UE 301 is described.

Within action 330, UE 301 determines whether requirements for CPAC or CHO towards one or more possible target SNs are fulfilled.

Within action 331, UE 301 determines that requirements for CPAC or CHO towards T-SN1 304 are fulfilled. In response to determining that requirements for CPAC or CHO towards T-SN1 304 are fulfilled, UE 301 derives a first SN counter value by using the SN counter value received from MN 302 within action 316 as first SN counter value. In this context, by the SN counter information received from MN 302 within action 316 comprising an SN counter value and an instruction to maintain the SN counter value, a particularly simple derivation of the first SN counter value can be achieved, such that for example complex calculation operations are not required and respective processor resources are saved.

Within action 332, UE 301 calculates a first $K_{SN}$ security key for T-SN1 304 using the derived first SN counter value as freshness input. Furthermore, UE 301 processes the SN counter information in that it adds a predefined step value, here in particular a step value of one, to the SN counter value received from the master node. In other words, UE 301 increases the SN counter by the step value, which is equal to one in this particular non-limiting example. In general however, step values different from one are readily conceivable. By adding the predefined step value to the SN counter value received from the master node, a second element in a sequence of SN counter values is obtained. Like this, UE 301 is enabled to derive at a later point of time, from the processed SN counter, a second SN counter value to generate a second $K_{SN}$ security key for the exchange of data with a second target SN. In this context, the second target SN may be T-SN2 305, or S-SN 303. Therefore, UE 301 can autonomously perform $K_{SN}$ refreshing for a CPAC or CHO towards the SCG associated with the second target SN without MN 302 having to transmit new configuration information for this CPAC or CHO. Thereby, it can also be achieved that RRC signalling overhead is reduced and fast mobility of UE 301 across different SCGs is enabled to a greater extent.

Within action 333, UE 301 transmits a fifth status information to MN 302. In this example embodiment, the fifth status information is indicative of a CPAC or CHO towards T-SN1 304.

Within action 334, MN 302 transmits further request information to T-SN1 304. In this example embodiment, the further request information comprises an SN modification request and comprises the first $K_{SN}$ security key, which has been calculated by MN 302 independently of UE 301.

Within action 335, T-SN1 304 transmits a sixth status information to MN 302. In this example embodiment, the sixth status information is indicative of an acknowledgement of an SN modification request.

Within action 336, MN 302 transmits a seventh status information to S-SN 303. In this example embodiment, the seventh status information is indicative of a CPAC or CHO, in particular a CPAC or CHO towards T-SN1 304.

Within action 337, MN 302 transmits an eighth status information to T-SN1 304. In this example embodiment, the eighth status information is indicative of a completion of an SN modification.

Within action 338, UE 301 and T-SN1 304 establish a connection. UE 301 and T-SN1 304 exchange data towards one another using the first $K_{SN}$ security key for integrity protection and/or ciphering. In this particular example embodiment, UE 301 and T-SN1 304 calculate a total of four subordinated security keys based on the first $K_{SN}$ security key. A first subordinated security key is used for integrity protection of RRC signalling. A second subordinated security key is used for ciphering of RRC signalling. A third subordinated security key is used for integrity protection of user data. A fourth subordinated security key is used for ciphering of user data. By establishing the connection and exchanging data, UE 301 may now be served by a serving cell associated with T-SN1 304, such that CPAC or CHO is completed. UE 301, MN 302 and T-SN1 304 may be operating in dual connectivity mode towards one another.

In the following, a second CPAC or CHO performed by UE 301 is described.

Within action 350, UE 301 determines whether requirements for CPAC or CHO towards one or more possible target SNs are fulfilled.

Within action 351, UE 301 determines that requirements for CPAC or CHO back towards S-SN 303 are fulfilled. In response to determining that requirements for CPAC or CHO back towards S-SN 303 are fulfilled, UE 301 derives a second SN counter value by using the present SN counter value, i.e. the SN counter value received from MN 302 increased by one, as second SN counter value. In this context, by the SN counter information received from MN 302 within action 316 comprising an SN counter value and an instruction to maintain the SN counter value, a particularly simple derivation of the second SN counter value can be achieved, such that for example complex calculation operations are not required and respective processor resources are saved.

Within action 352, UE 301 calculates a second $K_{SN}$ security key for S-SN 303 using the derived second SN counter value as freshness input. Furthermore, UE 301 further processes the SN counter information in that it adds, once again, the predefined step value to the present SN counter value. In other words, UE 301 once again increases the SN counter by the step value, which is equal to one in this particular non-limiting example. By adding the predefined step value to the present SN counter value, a third element in a sequence of SN counter values is obtained. Like this, UE 301 is enabled to derive at a later point of time, from the further processed SN counter, a further SN counter value to generate a further $K_{SN}$ security key for the exchange of data with a further target SN. In this context, the further target SN may be T-SN1 304, T-SN2 305, or an additional T-SN not shown in FIG. 3. Therefore, UE 301 can autonomously perform $K_{SN}$ refreshing for a CPAC or CHO towards the SCG associated with the further target SN without MN 302 having to transmit new configuration information for this CPAC or CHO. Thereby, it can also be achieved that RRC signalling overhead is reduced and fast mobility of UE 301 across different SCGs is enabled to a greater extent.

Within action 353, UE 301 transmits a ninth status information to MN 302. In this example embodiment, the ninth status information is indicative of a CPAC or CHO towards S-SN 303.

Within action 354, MN 302 transmits further request information to S-SN 303. In this example embodiment, the further request information comprises an SN modification request and comprises the second $K_{SN}$ security key, which has been calculated by MN 302 independently of UE 301.

Within action 355, S-SN 303 transmits a tenth status information to MN 302. In this example embodiment, the tenth status information is indicative of an acknowledgement of an SN modification request.

Within action 356, MN 302 transmits an eleventh status information to T-SN1 304. In this example embodiment, the eleventh status information is indicative of a CPAC or CHO, in particular a CPAC or CHO towards S-SN 303.

Within action 357, MN 302 transmits a twelfth status information to S-SN 303. In this example embodiment, the twelfth status information is indicative of a completion of an SN modification.

Within action 358, UE 301 and S-SN 303 establish a connection. UE 301 and S-SN 303 exchange data towards one another using the second $K_{SN}$ security key for integrity protection and/or ciphering. In this particular example embodiment, UE 301 and S-SN 303 calculate a total of four subordinated security keys based on the second $K_{SN}$ security key. A first subordinated security key is used for integrity protection of RRC signalling. A second subordinated security key is used for ciphering of RRC signalling. A third subordinated security key is used for integrity protection of user data. A fourth subordinated security key is used for ciphering of user data. By establishing the connection and exchanging data, UE 301 may now be served, once again, by a serving cell associated with S-SN 303, such that CPAC or CHO is completed. UE 301, MN 302 and S-SN 303 may be operating in dual connectivity mode towards one another.

Although not shown in FIG. 3, UE 301 may perform further CPACs or CHOs analogously to the first and second CPAC or CHO explained above.

In example embodiments, the key counter information comprised by the reconfiguration information transmitted from MN 302 to UE 301 within action 316 may define a maximum allowed number of additions of the predefined step value to the SN counter value received from the master node. For example, the key counter information may comprise a stop value for the SN counter which may not be exceeded. UE 301 may then determine, in particular when processing or further processing the SN counter, whether the maximum allowed number of additions has been reached. For example, UE 301 may determine whether the stop value has been reached. If it is determined that the maximum allowed number of additions has been reached, UE 301 may prevent further additions of the predefined step value to the present SN counter value. Furthermore, UE 301 may transmit respective information to MN 302. By the above procedure, the number of possible CPACs or CHOs performed by UE 301 can be specified by MN 302 when MN 302 initially transmits the configuration information to UE 301, such that the number of autonomous mobility events of UE 301 can be limited.

In the example embodiments described in conjunction with FIGS. 2 and 3, the configuration information may also indicate to UE 201, 301 at least one target secondary cell for which generating a $K_{SN}$ security key is not required. Thereby, it can be achieved that unnecessary derivations of SN counter values, unnecessary generations of $K_{SN}$ security keys, and/or unnecessary processings of the key counter information, are avoided, in particular if UE 201, 301 moves or switches between cells within the same SCG.

In the example embodiments described in conjunction with FIGS. 2 and 3, MN 202, 302 may comprise a gNB-CU-CP node performing the described actions of MN 202, 302.

Figure 4:
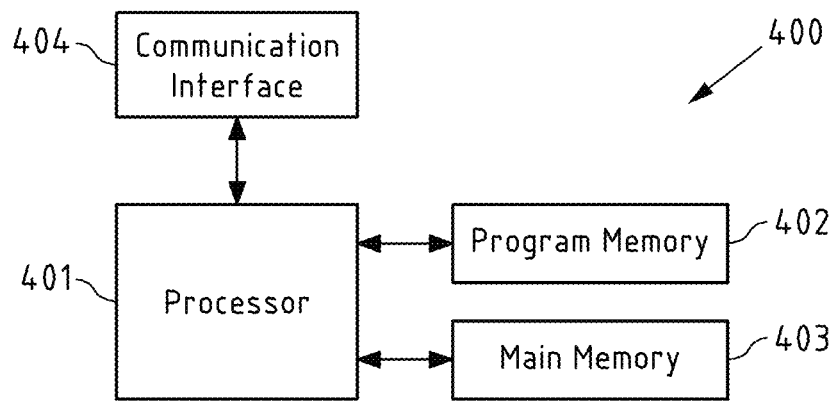
FIG. 4 shows, in a schematic block diagram, an example embodiment of a user equipment according to the first aspect.

Turning now to FIG. 4, there is shown a block diagram of an example embodiment of a UE 400 according to the first aspect. For example, UE 400 may be one of a smartphone, a tablet computer, a notebook computer, a smart watch, a smart band, an IoT device or a vehicle or a part thereof.

UE 400 comprises a processor 401. Processor 401 may represent a single processor or two or more processors, which are for instance at least partially coupled, for instance via a bus. Processor 401 executes program code stored in program memory 402 (for instance program code causing UE 400 in connection with radio node 500 to perform one or more of the embodiments of a method according to the present disclosure or parts thereof, when executed on processor 401) and interfaces with a main memory 403. Program memory 402 may also contain an operating system for processor 401. Some or all of memories 402 and 403 may also be included into processor 401.

One or both of a main memory and a program memory of a processor (e.g. program memory 402 and main memory 403) could be fixedly connected to the processor (e.g. processor 401) or at least partially removable from the processor, for instance in the form of a memory card or stick.

A program memory (e.g. program memory 402) may for instance be a non-volatile memory. It may for instance be a FLASH memory (or a part thereof), any of a ROM, PROM, EPROM, MRAM or a FeRAM (or a part thereof) or a hard disc (or a part thereof), to name but a few examples. For example, a program memory may for instance comprise a first memory section that is fixedly installed, and a second memory section that is removable from, for instance in the form of a removable SD memory card.

A main memory (e.g. main memory 403) may for instance be a volatile memory. It may for instance be a DRAM memory, to give non-limiting example. It may for instance be used as a working memory for processor 401 when executing an operating system, an application, a program, and/or the like.

Processor 401 may further control a communication interface 404 (e.g. radio interface) configured to receive and/or transmit data and/or information. For instance, communication interface 404 may be configured to transmit and/or receive radio signals from a radio node, such as a master node or a secondary node, in particular as described herein. It is to be understood that any computer program code based processing required for receiving and/or evaluating radio signals may be stored in an own memory of communication interface 404 and executed by an own processor of communication interface 404 and/or it may be stored for example in memory 403 and executed for example by processor 401.

Communication interface 404 may in particular be configured to communicate according to a cellular communication system like a 2G/3G/4G/5G or future generation cellular communication system. UE 400 may use radio interface 404 to communicate with a radio node, such as a master node or a secondary node, in particular as described herein.

For example, communication interface 404 may further comprise a BLE and/or Bluetooth radio interface including a BLE transmitter, receiver or transceiver. For example, radio interface 404 may additionally or alternatively comprise a WLAN radio interface including at least a WLAN transmitter, receiver or transceiver.

The components 402, 403 and 404 of UE 400 may for instance be connected with processor 401 by means of one or more serial and/or parallel busses.

It is to be understood that UE 400 may comprise various other components. For example, UE 400 may optionally comprise a user interface (e.g. a touch-sensitive display, a keyboard, a touchpad, a display, etc.).

Figure 5:
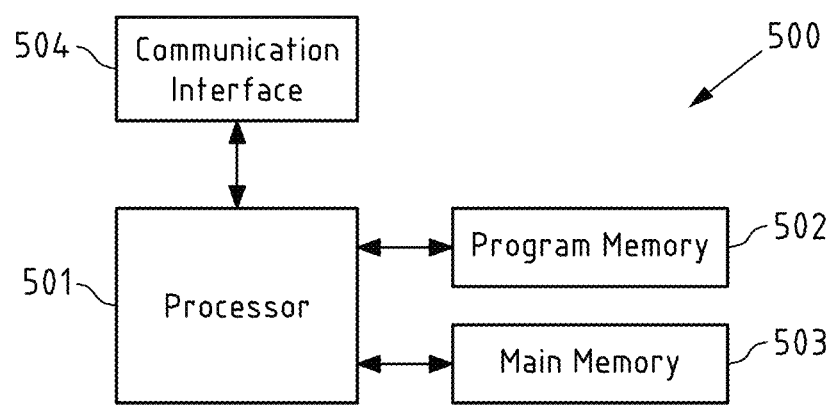
FIG. 5 shows, in a schematic diagram, an example embodiment of a radio node, such as a master node or a secondary node, according to the second or third aspect.

FIG. 5 is a block diagram of an example embodiment of a radio node 500, such as a master node 500 or a secondary node 500. For instance, radio node 500 may be configured for scheduling and/or transmitting signals to UE 400, and/or to one or more further radio nodes 500, as described above.

Radio node 500 comprises a processor 501. Processor 501 may represent a single processor or two or more processors, which are for instance at least partially coupled, for instance via a bus. Processor 501 executes a program code stored in program memory 502 (for instance program code causing radio node 500 to perform alone, together with UE 400, and/or together with one or more further radio nodes 500, one or more of the embodiments of a method according to the present disclosure or parts thereof, when executed on processor 501), and interfaces with a main memory 503.

Program memory 502 may also comprise an operating system for processor 501. Some or all of memories 502 and 503 may also be included into processor 501.

Moreover, processor 501 may control a communication interface 504 which is for example configured to communicate according to a cellular communication system like a 2G/3G/4G/5G cellular communication system. Communication interface 504 of radio node 500 may be realized by radio heads for instance and may be provided for communication between network device and terminal device.

The components 502, 503 and 504 of radio node 500 may for instance be connected with processor 501 by means of one or more serial and/or parallel busses.

It is to be understood that radio node 500 may comprise various other components.

Figure 6:
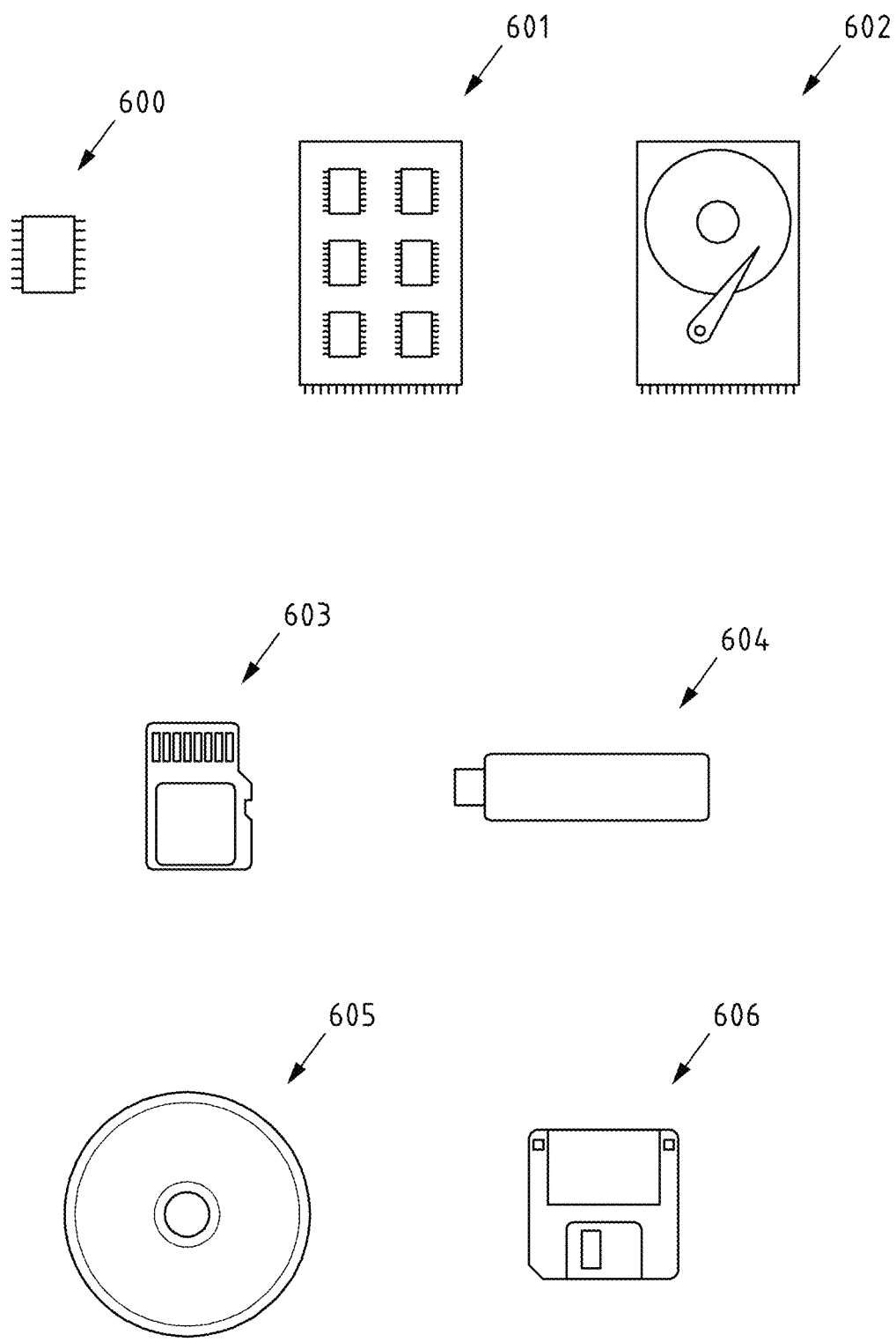
FIG. 6 shows, in a schematic illustration, examples of tangible and non-transitory computer-readable storage media.

FIG. 6 is a schematic illustration of examples of tangible and non-transitory computer-readable storage media according to the present disclosure that may for instance be used to implement memory 402 of FIG. 4 or memory 502 of FIG. 5. To this end, FIG. 6 displays a flash memory 600, which may for instance be soldered or bonded to a printed circuit board, a solid-state drive 601 comprising a plurality of memory chips (e.g. Flash memory chips), a magnetic hard drive 602, a Secure Digital (SD) card 603, a Universal Serial Bus (USB) memory stick 604, an optical storage medium 605 (such as for instance a CD-ROM or DVD) and a magnetic storage medium 606.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry);
(b) combinations of circuits and software (and/or firmware), such as:
(i) a combination of processor(s), or
(ii) sections of processor(s)/software (including digital signal processor(s)), software, and memory(ies) that work together to cause an apparatus, such as a mobile phone, to perform various functions); and
(c) circuits, such as a microprocessor(s) or a section of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or section of a processor and its (or their) accompanying software and/or firmware. The term 'circuitry' also covers, for example, a baseband integrated circuit or applications processor integrated circuit for a mobile phone.

Any of the processors mentioned in this text, in particular but not limited to processors 401 and 501 of FIGS. 4 and 5, could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Moreover, any of the actions or steps described or illustrated herein may be implemented using executable instructions in a general-purpose or special-purpose processor and stored on a computer-readable storage medium (e.g. disk, memory, or the like) to be executed by such a processor. References to 'computer-readable storage medium' should be understood to encompass specialized circuits such as FPGAs, ASICs, signal processing devices, and other devices.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The wording "A, or B, or C, or a combination thereof" or "at least one of A, B and C" may be understood to be not exhaustive and to include at least the following: (i) A, or (ii) B, or (iii) C, or (iv) A and B, or (v) A and C, or (vi) B and C, or (vii) A and B and C.

It will be understood that the embodiments disclosed herein are only exemplary, and that any feature presented for a particular exemplary embodiment may be used with any aspect of the present disclosure on its own or in combination with any feature presented for the same or another particular exemplary embodiment and/or in combination with any other feature not mentioned. It will further be understood that any feature presented for an example embodiment in a particular category may also be used in a corresponding manner in an example embodiment of any other category.

ABBREVIATIONS

3GPP 3rd Generation Partnership Project
CHO Conditional Handover
CPAC Conditional PSCell Addition or Change
DC Dual Connectivity
LMF Location Management Function
MCG Master Cell Group
MN Master Node
NAS Non-Access Stratum
NR New Radio PSCell Primary Cell of SCG (Primary SCG Cell)
RACH random access channel
SCG Secondary Cell Group
SN Secondary Node
S-SN Source Secondary Node
RRC Radio Resource Control
T-SN Target Secondary Node
UE User Equipment

REFERENCES

[1] 3GPP TS 36.300 V 17.1.0 "Evolved Universal Terrestrial Radio Access (E-UTRA) and Evolved Universal Terrestrial Radio Access Network (E-UTRAN); Overall description; Stage 2 (Release 17)", June 2022.
[2] 3GPP TS 37.340 V17.1.0 "Evolved Universal Terrestrial Radio Access (E-UTRA) and NR; Multi-connectivity; Stage 2 (Release 17)", June 2022.
[3] 3GPP TS 38.331 V17.1.0 "NR; Radio Resource Control (RRC) protocol specification (Release 17)", June 2022.
[4] 3GPP TS 33.501 V17.6.0 "Security architecture and procedures for 5G system (Release 17)", June 2022.

We claim:

1. A user equipment configured to support dual connectivity operation towards a master node and a secondary node of a radio access network, the user equipment comprising at least one processor and at least one memory, the at least one memory storing instructions that, when executed by the at least one processor, cause the user equipment to perform at least the following:
establishing a connection towards the master node;
receiving configuration information from the master node, wherein the configuration information comprises key counter information which defines a sequence of at least two different key counter values to generate at least two different security keys for at least two different target secondary nodes; wherein a first target secondary node is configured for a first conditional PSCell addition or change (CPAC) or a conditional handover (CHO) towards the first target secondary node, and wherein a second target secondary node is configured for a subsequent conditional PSCell addition or change (CPAC) or a conditional handover (CHO) towards the second target secondary node;
generating a first security key using a first key counter value derived from the key counter information;
using the first security key for integrity protection and/or ciphering of data exchanged between the user equipment and the first target secondary node; and
processing the key counter information such that the user equipment is enabled to derive, from the processed key counter information, at least a second key counter value, which is different from the first key counter value,
wherein the generating the first security key comprises using a first list element in a list of key counter values included in the key counter information as the first key counter value, wherein processing the key counter information comprises removing the first list element from the list of key counter values.

2. The user equipment according to claim 1, the at least one memory further storing instructions that, when executed by the at least one processor, cause the user equipment to perform at least one of the following:

generating a second security key, which is different from the first security key, using the second key counter value derived from the processed key counter information;
using the second security key for integrity protection and/or ciphering of data exchanged between the user equipment and the second target secondary node, which is different from the first target secondary node;
further processing the key counter information such that the user equipment is enabled to derive, from the further processed key counter information, at least a further key counter value, which is different from the first key counter value and different from the second key counter value.

3. The user equipment according to claim 1, wherein the key counter information received from the master node defines a list of at least two different key counter values.

4. The user equipment according to claim 2, wherein generating the second security key comprises using the presently first list element in the list of key counter values as the second key counter value, wherein further processing the key counter information comprises removing the presently first list element from the list of key counter values.

5. The user equipment according to claim 4,
wherein the configuration information comprises key counter information which defines a list of at least two different SN counter values to generate at least two different $K_{SN}$ security keys for at least two different target secondary nodes,
wherein the first key counter value is a first SN counter value, wherein the second key counter value is a second SN counter value, wherein the first security key is a first $K_{SN}$ security key, wherein the second security key is a second $K_{SN}$ security key,
wherein the configuration information further comprises a radio resource control reconfiguration request,
wherein the configuration information further comprises information which is related to a conditional addition or change of a primary cell of a secondary cell group associated with the first target secondary node or related to a conditional handover towards the first target secondary node,
wherein the configuration information further comprises information which is related to a conditional addition or change of a primary cell of a secondary cell group associated with the second target secondary node or related to a conditional handover towards the second target secondary node,
the at least one memory further storing instructions that, when executed by the at least one processor, cause the user equipment to perform at least one of the following:
determining whether at least one condition for a conditional addition or change of a primary cell of a secondary cell group associated with the first target secondary node or at least one condition for a conditional handover towards the first target secondary node is fulfilled;
initiating, via a random access channel, a random access procedure towards the first target secondary node using the first $K_{SN}$ security key;
determining whether at least one condition for a conditional addition or change of a primary cell of a secondary cell group associated with the second target secondary node or at least one condition for a conditional handover towards the second target secondary node is fulfilled;

initiating, via a random access channel, a random access procedure towards the second target secondary node using the second $K_{SN}$ security key.

6. The user equipment according to claim 3, the at least one memory further storing instructions that, when executed by the at least one processor, cause the user equipment to perform at least the following:
receiving at least one additional list element for the list of key counter values from the master node.

7. The user equipment according to claim 1, wherein the key counter information received from the master node comprises a key counter value and an instruction to maintain the key counter value.

8. The user equipment according to claim 1, wherein generating the first security key comprises using the key counter value received from the master node as the first key counter value, wherein processing the key counter information comprises adding a predefined step value to the key counter value received from the master node.

9. The user equipment according to claim 2, wherein generating the second security key comprises using the present key counter value as the second key counter value, wherein further processing the key counter information comprises adding a predefined step value to the present key counter value.

10. The user equipment according to claim 9,
wherein the configuration information comprises key counter information which defines a sequence of at least two different SN counter values to generate at least two different $K_{SN}$ security keys for at least two different target secondary nodes,
wherein the key counter information received from the master node comprises an SN counter value and an instruction to maintain the SN counter value,
wherein the first key counter value is a first SN counter value, wherein the second key counter value is a second SN counter value, wherein the first security key is a first $K_{SN}$ security key, wherein the second security key is a second $K_{SN}$ security key,
wherein the configuration information further comprises a radio resource control reconfiguration request,
wherein the configuration information further comprises information which is related to a conditional addition or change of a primary cell of a secondary cell group associated with the first target secondary node or related to a conditional handover towards the first target secondary node,
wherein the configuration information further comprises information which is related to a conditional addition or change of a primary cell of a secondary cell group associated with the second target secondary node or related to a conditional handover towards the second target secondary node,
the at least one memory further storing instructions that, when executed by the at least one processor, cause the user equipment to perform at least one of the following:
determining whether at least one condition for a conditional addition or change of a primary cell of a secondary cell group associated with the first target secondary node or at least one condition for a conditional handover towards the first target secondary node is fulfilled;
initiating, via a random access channel, a random access procedure towards the first target secondary node using the first $K_{SN}$ security key;
determining whether at least one condition for a conditional addition or change of a primary cell of a secondary cell group associated with the second target secondary node or at least one condition for a conditional handover towards the second target secondary node is fulfilled;
initiating, via a random access channel, a random access procedure towards the second target secondary node using the second $K_{SN}$ security key.

11. The user equipment according to claim 8, wherein the key counter information received from the master node defines a maximum allowed number of additions of the predefined step value to the key counter value received from the master node, the at least one memory further storing instructions that, when executed by the at least one processor, cause the user equipment to perform at least the following:
determining whether the maximum allowed number of additions has been reached;
in response to determining that the maximum allowed number of additions has been reached, preventing further additions of the predefined step value to the present key counter value.

12. The user equipment according to claim 2, the at least one memory further storing instructions that, when executed by the at least one processor, cause the user equipment to perform at least one of the following:
generating a further security key, which is different from the first security key and different from the second security key, using the further key counter value derived from the further processed key counter information;
using the further security key for integrity protection and/or ciphering of data exchanged between the user equipment and a further target secondary node, which is different from the second target secondary node;
further processing the key counter information such that the user equipment is enabled to derive, from the further processed key counter information, at least one further key counter value, which is different from the first key counter value, different from the second key counter value, and different from any other key counter value derived previously from the non-processed, processed or further processed key counter information.

13. The user equipment according to claim 1, wherein the configuration information further comprises information indicative of at least one target secondary cell for which generating a security key is not required.

14. The user equipment according to claim 1, the at least one memory further storing instructions that, when executed by the at least one processor, cause the user equipment to further perform: establishing a connection towards the secondary node; and
wherein the first target secondary node is configured for a first conditional PSCell addition or change (CPAC) or a conditional handover (CHO) from the secondary node the UE is connected to towards the first target secondary node, and wherein a second target secondary node is configured for a subsequent conditional PSCell addition or change (CPAC) or a conditional handover (CHO) from the first target secondary node the UE is connected to after the first CPAC or CHO towards the second target secondary node.

15. A non-transitory computer-readable medium comprising program instructions that, when executed by a user equipment configured to support dual connectivity operation towards a master node and a secondary node of a radio access network, cause the user equipment to perform at least the following:

establishing a connection towards the master node;
receiving configuration information from the master node, wherein the configuration information comprises key counter information which defines a sequence of at least two different key counter values to generate at least two different security keys for at least two different target secondary nodes; wherein a first target secondary node is configured for a first conditional PSCell addition or change (CPAC) or a conditional handover (CHO) towards the first target secondary node, and wherein a second target secondary node is configured for a subsequent conditional PSCell addition or change (CPAC) or a conditional handover (CHO) towards the second target secondary node;
generating a first security key using a first key counter value derived from the key counter information;
using the first security key for integrity protection and/or ciphering of data exchanged between the user equipment and a first target secondary node; and
processing the key counter information such that the user equipment is enabled to derive, from the processed key counter information, at least a second key counter value, which is different from the first key counter value,
wherein the generating the first security key comprises using a first list element in a list of key counter values included in the key counter information as the first key counter value, wherein processing the key counter information comprises removing the first list element from the list of key counter values.

16. A master node of a radio access network, the master node configured to support dual connectivity operation towards a secondary node of the radio access network and a user equipment, the master node comprising at least one processor and at least one memory, the at least one memory storing instructions that, when executed by the at least one processor, cause the master node to perform at least the following:
establishing a connection towards the user equipment;
transmitting configuration information to the user equipment, wherein the configuration information comprises key counter information which defines a sequence of at least two different key counter values to generate at least two different security keys for at least two different target secondary nodes; wherein a first target secondary node is configured for a first conditional PSCell addition or change (CPAC) or a conditional handover (CHO) towards the first target secondary node, and wherein a second target secondary node is configured for a subsequent conditional PSCell addition or change (CPAC) or a conditional handover (CHO) towards the second target secondary node;
generating a first security key using a first key counter value derived from the key counter information;
using the first security key for integrity protection and/or ciphering of data exchanged between the user equipment and the first target secondary node; and
processing the key counter information such that the user equipment is enabled to derive, from the processed key counter information, at least a second key counter value, which is different from the first key counter value, wherein the generating the first security key comprises using a first list element in a list of key counter values included in the key counter information as the first key counter value, wherein processing the key counter information comprises removing the first list element from the list of key counter values.

17. The master node according to claim 16, wherein the key counter information transmitted to the user equipment defines a list of at least two different key counter values.

18. The master node according to claim 17, the at least one memory further storing instructions that, when executed by the at least one processor, cause the master node to perform at least the following:
generating a list of at least two different security keys which corresponds to the list of at least two different key counter values defined by the key counter information transmitted to the user equipment;
transmitting request information to at least one target secondary node, wherein the request information comprises the generated list of security keys.

19. The master node according to claim 18, the at least one memory further storing instructions that, when executed by the at least one processor, cause the master node to perform at least one of the following:
receiving, from a first target secondary node, information indicative of a security key switch;
transmitting, to at least one other target secondary node, an instruction to remove the first list element from the list of security keys, wherein the at least one other target secondary node is different from the first target secondary node.

20. The master node according to claim 19, the at least one memory further storing instructions that, when executed by the at least one processor, cause the master node to perform at least one of the following:
receiving, from a second target secondary node, information indicative of a security key switch, wherein the second target secondary node is different from the first target secondary node;
transmitting, to at least one further target secondary node, an instruction to remove the presently first list element from the list of security keys, wherein the at least one further target secondary node is different from the second target secondary node.

21. The master node according to claim 18, the at least one memory further storing instructions that, when executed by the at least one processor, cause the master node to perform at least the following:
transmitting at least one additional list element for the list of key counter values to the user equipment;
transmitting at least one additional list element for the list of security keys to at least one target secondary node.

22. The master node according to claim 16, wherein the key counter information transmitted to the user equipment comprises a key counter value and an instruction to maintain the key counter value.

23. The master node according to claim 16, wherein the master node comprises a gNB-CU-CP node comprising at least one processor and at least one memory, wherein the instructions are stored on the at least one memory of the gNB-CU-CP node to be executed by the at least one processor of the gNB-CU-CP node.

24. The master node according to claim 16, wherein the configuration information further comprises information indicative of at least one target secondary cell for which generating a security key is not required.

25. A non-transitory computer-readable medium comprising program instructions that, when executed by a master node of a radio access network, the master node configured to support dual connectivity operation towards a secondary node of the radio access network and a user equipment, cause the master node to perform at least the following:
establishing a connection towards the user equipment;

transmitting configuration information to the user equipment, wherein the configuration information comprises key counter information which defines a sequence of at least two different key counter values to generate at least two different security keys for at least two different target secondary nodes; wherein a first target secondary node is configured for a first conditional PSCell addition or change (CPAC) or a conditional handover (CHO) towards the first target secondary node, and wherein a second target secondary node is configured for a subsequent conditional PSCell addition or change (CPAC) or a conditional handover (CHO) towards the second target secondary node;

generating a first security key using a first key counter value derived from the key counter information;

using the first security key for integrity protection and/or ciphering of data exchanged between the user equipment and the first target secondary node; and processing the key counter information such that the user equipment is enabled to derive, from the processed key counter information, at least a second key counter value, which is different from the first key counter value, wherein the generating the first security key comprises using a first list element in a list of key counter values included in the key counter information as the first key counter value, wherein processing the key counter information comprises removing the first list element from the list of key counter values.

* * * * *